US012451149B2

(12) United States Patent
Jackson et al.

(10) Patent No.: US 12,451,149 B2
(45) **Date of Patent: *Oct. 21, 2025**

(54) MULTICHANNEL PLAYBACK DEVICES AND ASSOCIATED SYSTEMS AND METHODS

(71) Applicant: Sonos, Inc., Santa Barbara, CA (US)

(72) Inventors: Richard Jackson, Boston, MA (US); Hilmar Lehnert, Framington, MA (US); Chris Davies, Santa Barbara, CA (US); Paul MacLean, Quincy, MA (US); Roberto Maria Dizon, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,864

(22) Filed: Jan. 29, 2024

(65) Prior Publication Data

US 2024/0242724 A1 Jul. 18, 2024

Related U.S. Application Data

(63) Continuation of application No. 17/445,296, filed on Aug. 17, 2021, now Pat. No. 11,922,955.
(Continued)

(51) Int. Cl.
*H04S 3/00* (2006.01)
*G10L 19/008* (2013.01)
*H04S 7/00* (2006.01)

(52) U.S. Cl.
CPC ............ *G10L 19/008* (2013.01); *H04S 3/008* (2013.01); *H04S 7/30* (2013.01); *H04S 2400/01* (2013.01)

(58) Field of Classification Search
CPC ....... G10L 19/008; G10L 15/22; H04S 3/008; H04S 3/00; H04S 7/30; H04S 7/302;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Leshui Zhang
(74) *Attorney, Agent, or Firm* — Fortem IP LLP

(57) ABSTRACT

Multichannel audio playback devices and associated systems and methods are disclosed herein. In some examples, a first playback device is configured to receive a source stream of audio content comprising left, right and center input channels. In a first mode, the first playback device is configured to play back audio via a plurality of transducers based on the left, right, and center input channels. In a second mode, in which the first playback device is bonded to second and third playback devices, the first playback device is configured to (i) play back audio via the plurality of transducers based on at least the center input channel, (ii) cause audio to be played via the second playback device based on at least the right input channel, and (iii) cause audio to be played via the third playback device based on at least the left input channel.

20 Claims, 14 Drawing Sheets

Related U.S. Application Data

(60) Provisional application No. 62/706,543, filed on Aug. 24, 2020.

(58) Field of Classification Search

CPC . H04S 7/303; H04S 7/308; H04S 7/40; H04S 7/00; H04S 2400/01; H04S 2400/05; H04S 2400/11; H04S 2400/15; H04S 2420/01; H04S 7/301; H04S 7/305; H04S 2400/13; H04S 3/02; H04S 5/005; H04S 2400/03; H04R 29/007; H04R 29/005; H04R 29/008; H04R 29/00; H04R 2227/005; H04R 2420/07; H04R 27/00; H04R 5/04; H04R 5/00; H04R 3/12; H04R 2430/00; H04R 2430/21; H04R 2430/23; H04R 2227/007; H04R 2227/001; H04R 2420/00; H04R 2420/01; H04R 2420/03; H04R 2420/05; H04R 2227/003; H04R 5/02; H04R 1/403; H04R 2430/01; H04R 2205/024; H04R 1/323; H04R 2203/12; H04R 29/002; H04R 2201/403; H04R 29/001; H04R 2499/11; H04R 3/14; H04R 2430/20; G06F 3/165; G06F 3/167; G06F 3/16; G06F 3/162; G06F 3/04842

USPC .... 704/500–504; 381/10, 11, 12, 17, 18, 19, 381/20, 21, 22, 23, 300–311, 27, 56, 58, 381/61, 66, 77, 78, 80, 81, 85, 86, 381/104–110, 111, 116, 117, 118, 119, 381/123; 700/94

See application file for complete search history.

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2008/0273721 | A1* | 11/2008 | Walsh | H04S 5/00 381/300 |
| 2015/0331663 | A1* | 11/2015 | Beckhardt | H04N 21/4302 700/94 |
| 2016/0196106 | A1* | 7/2016 | Hammer | H04R 3/12 381/79 |
| 2017/0289723 | A1* | 10/2017 | Yoo | H04S 3/002 |
| 2018/0302711 | A1* | 10/2018 | Katayama | G06F 3/16 |
| 2020/0162820 | A1* | 5/2020 | Kallai | H04S 7/30 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Final Office Action mailed on Feb. 28, 2023, issued in connection with U.S. Appl. No. 17/445,296, filed Aug. 17, 2021, 21 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Non-Final Office Action mailed on Sep. 16, 2022, issued in connection with U.S. Appl. No. 17/445,296, filed Aug. 17, 2021, 18 pages.

Notice of Allowance mailed on Aug. 16, 2023, issued in connection with U.S. Appl. No. 17/445,296, filed Aug. 17, 2021, 8 pages.

Notice of Allowance mailed on Nov. 6, 2023, issued in connection with U.S. Appl. No. 17/445,296, filed Aug. 17, 2021, 8 pages.

Palm, Inc., "Handbook for the Palm VII Handheld," May 2000, 311 pages.

Presentations at WinHEC 2000, May 2000, 138 pages.

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Bureau, International Preliminary Report on Patentability and Written Opinion, mailed on Mar. 9, 2023, issued in connection with International Application No. PCT/US2021/071215, filed on Aug. 17, 2021, 12 pages.

* cited by examiner

MULTICHANNEL PLAYBACK DEVICES AND ASSOCIATED SYSTEMS AND METHODS

CROSS-REFERENCE TO RELATED APPLICATION

This application is a continuation of U.S. patent application Ser. No. 17/445,296, filed Aug. 17, 2021, now U.S. Pat. No. 11,922,955, which claims the benefit of priority to U.S. Patent Application No. 62/706,543, filed Aug. 24, 2020, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, embodiments, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
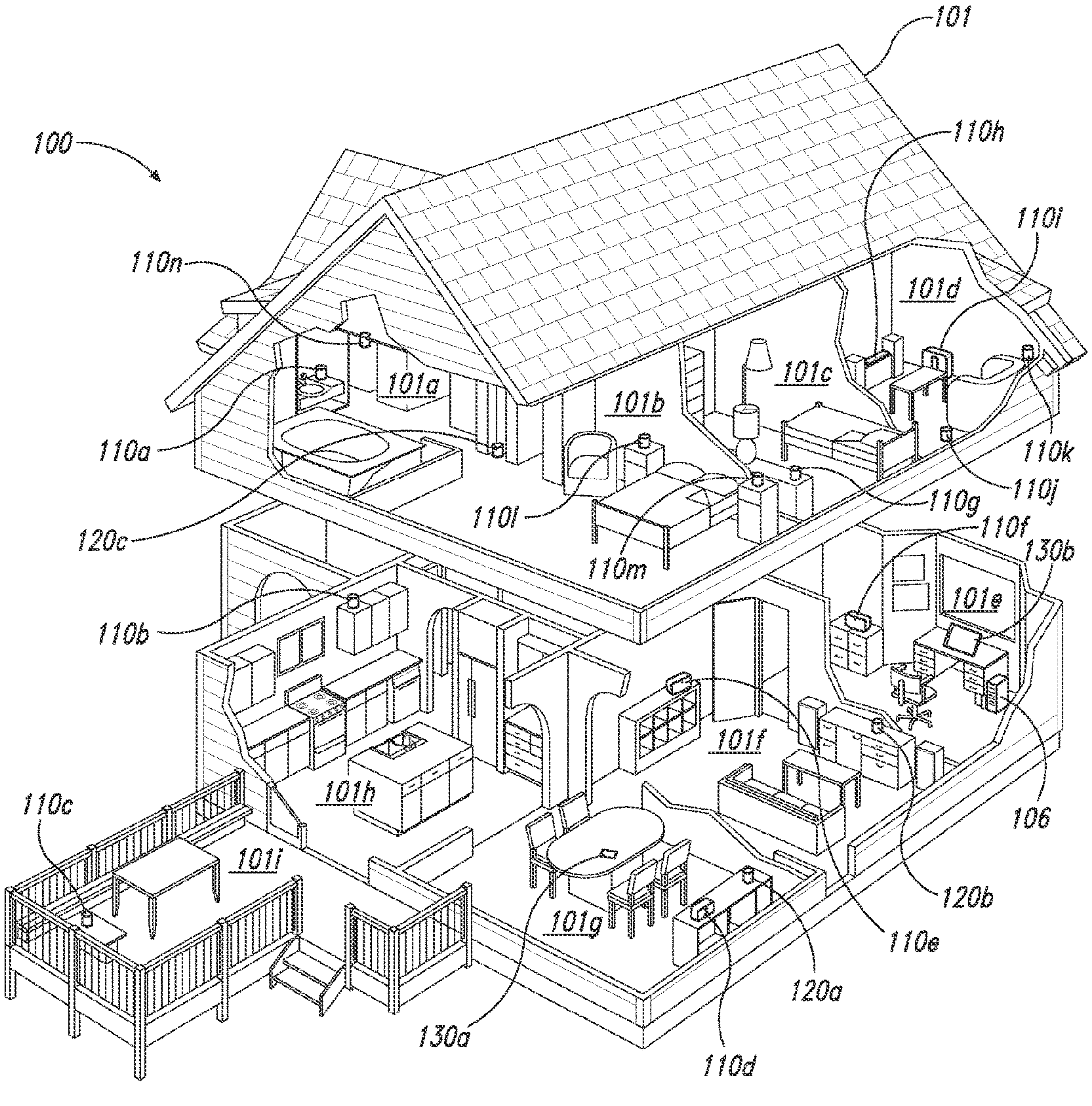
FIG. 1A is a partial cutaway view of an environment having a media playback system configured in accordance with examples of the disclosed technology.

The drawings are for the purpose of illustrating examples, but those of ordinary skill in the art will understand that the technology disclosed herein is not limited to the arrangements and/or instrumentality shown in the drawings.

DETAILED DESCRIPTION

I. Overview

In conventional home-theatre arrangements, there are ideally n (e.g., 5, 7, 11) identical speakers (in addition to one or more subwoofers) such that the acoustic signatures of each of the channels (excluding any low-frequency effect channel) are substantially identical and any content that moves around "blends" between the channels to provide an immersive listening experience. Many audio playback devices are capable of providing multichannel audio content for use in the home theatre context. For example, a soundbar or other such playback device can simultaneously output left channel audio, right channel audio, and center channel audio. Such a multichannel playback device may be used alone or in conjunction with one or more additional devices (e.g., discrete left rear and right rear devices, one or more subwoofers, etc.). In some cases, however, it may be desirable to utilize such a playback device in conjunction with discrete devices configured to play back at least some of the channels that would otherwise be played back via the multichannel playback device. For example, a soundbar may be bonded with discrete satellite playback devices that play back right and left channels. Using such discrete satellite playback devices for playback of left and right channels may increase the width of the overall sound stage or perceived spaciousness of the audio content. In some instances, the multichannel device (e.g., a soundbar) may simply play back the center channel audio content while left and right channels are played back by the discrete satellite devices. However, this approach presents certain challenges. For example, the directivity of the center channel played back by the multichannel device (e.g., the soundbar) may be significantly different than the directivity of the satellite devices, thus complicating the ability to "blend" the audio outputs to achieve an effective surround sound listening experience. Additionally, the acoustic signatures or characteristics (e.g., radiation patterns) of the audio outputs from each playback device may also differ, thereby creating a less desirable listening experience. As such, multichannel audio devices (such as soundbars configured to play back left, right, and center channels) may be ill-equipped to operate as part of a 5.1, 7.1 or 11.1 home theatre system in which left and right channels are played back by discrete satellite devices.

Examples of the disclosed technology address at least some of these issues associated with playing back multichannel audio content. As explained in more detail elsewhere herein, some examples of the disclosed technology relate to a playback device able to operate in a first mode in which a plurality of channels are played back by the device, and a second mode when fewer than all of the plurality of channels are played back by the device, with one or more of the channels being played back by discrete satellite playback device(s). For example, a soundbar can be configured to operate in a first mode in which the soundbar plays back right, left, and center channels together. In a second mode, the left and right channels can be output via discrete satellite playback devices, while at least the center channel is played back via the soundbar. Additionally, the soundbar may utilize a different audio processing scheme in the second mode in order to output audio having characteristics (e.g., acoustic signature, directivity, radiation patterns) nearer to those of the discrete playback devices. In some examples, in the second mode, the soundbar may utilize more transducers to play back the center channel audio content as compared to the first mode, thereby improving the quality of the center channel audio output.

In some examples, a first playback device can comprise a plurality of transducers, a network interface, one or more processors, and a computer readable medium for storing instructions. When executed by the one or more processors, the instructions can cause the first playback device to (i) receive a source stream of audio content comprising a left input channel, a right input channel, and a center input channel, and (ii) operate in one of a plurality of different modes. In a first mode, audio is played back via the plurality of transducers based on the left input channel, the right input channel, and the center input channel. That is, the first playback device plays back full portions of each of the three input channels. In a second mode, in which the first playback device is bonded to one or more satellite playback devices, the first playback device plays back audio via the plurality of transducers based on at least the center input channel, and causes audio to be played back via the one or more satellite playback devices based on at least the right input channel and/or the left input channel. In doing so, the first playback device plays back a full portion of the center input channel, and less than a full portion of the left and right input channels. In some examples, the audio played back via the first playback device, when in the second mode, is based on one or more parameters associated with the one or more satellite playback devices and thereby enables the audio played back via the first playback device to have an acoustic signature that matches or is at least substantially similar to an acoustic signature of the audio played back via the one or more satellite playback devices. In doing so, examples of the disclosed technology can enable desirable multichannel audio to be played back via a standalone playback device, and via a playback device bonded to one or more other playback devices.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some examples, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the outdoor patio 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
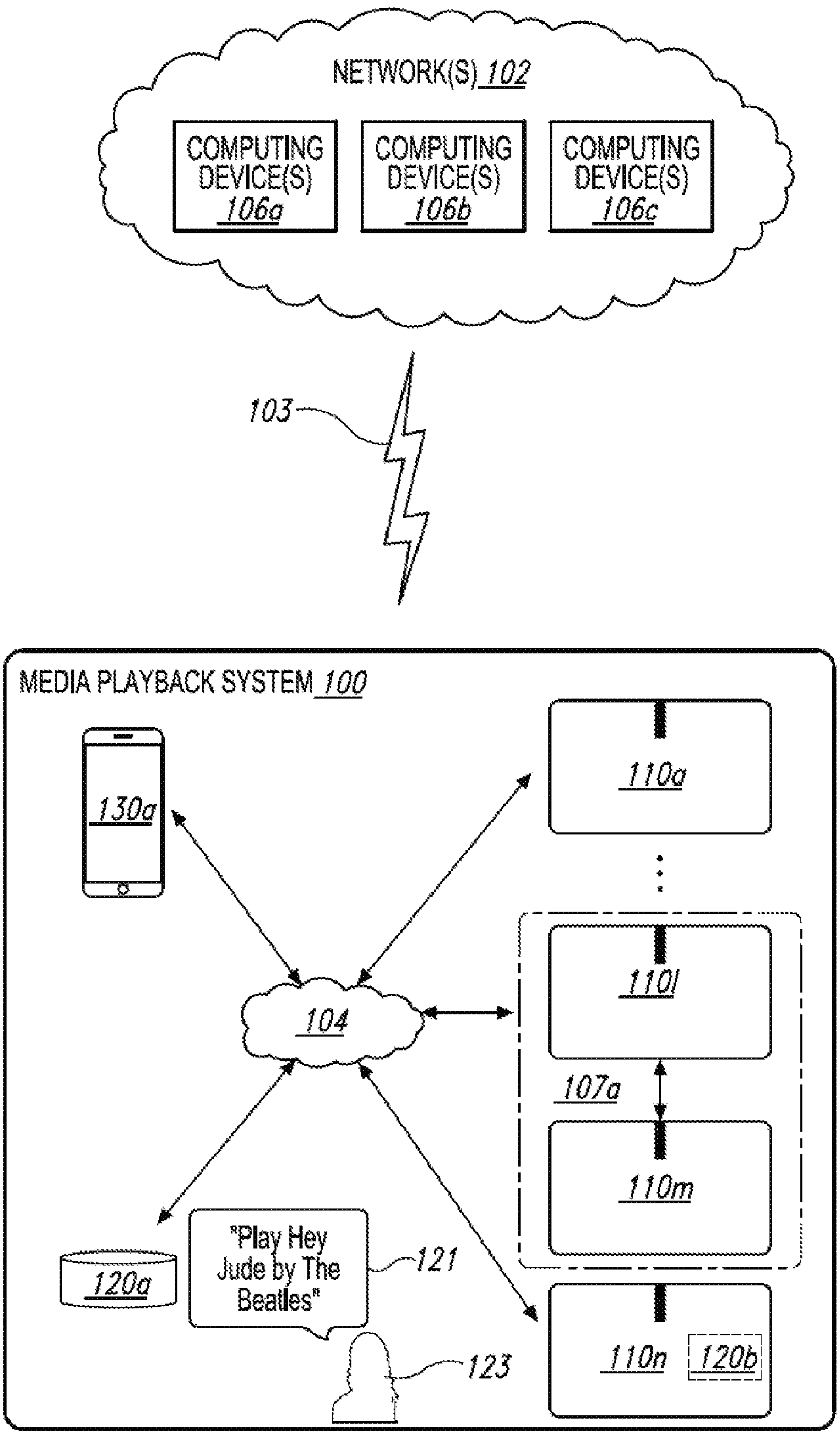
FIG. 1B is a schematic diagram of the media playback system of FIG. 1A and one or more networks.

FIG. 1B is a schematic diagram of the media playback system 100 and a cloud network 102. For case of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, the media content database is stored on one or more of the playback devices 110, network microphone devices 120, and/or control devices 130.

In the illustrated example of FIG. 1B, the playback devices **110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for example, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110**.

The media playback system 100 includes the NMDs **120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110**.

b. Suitable Playback Devices

Figure 1C:
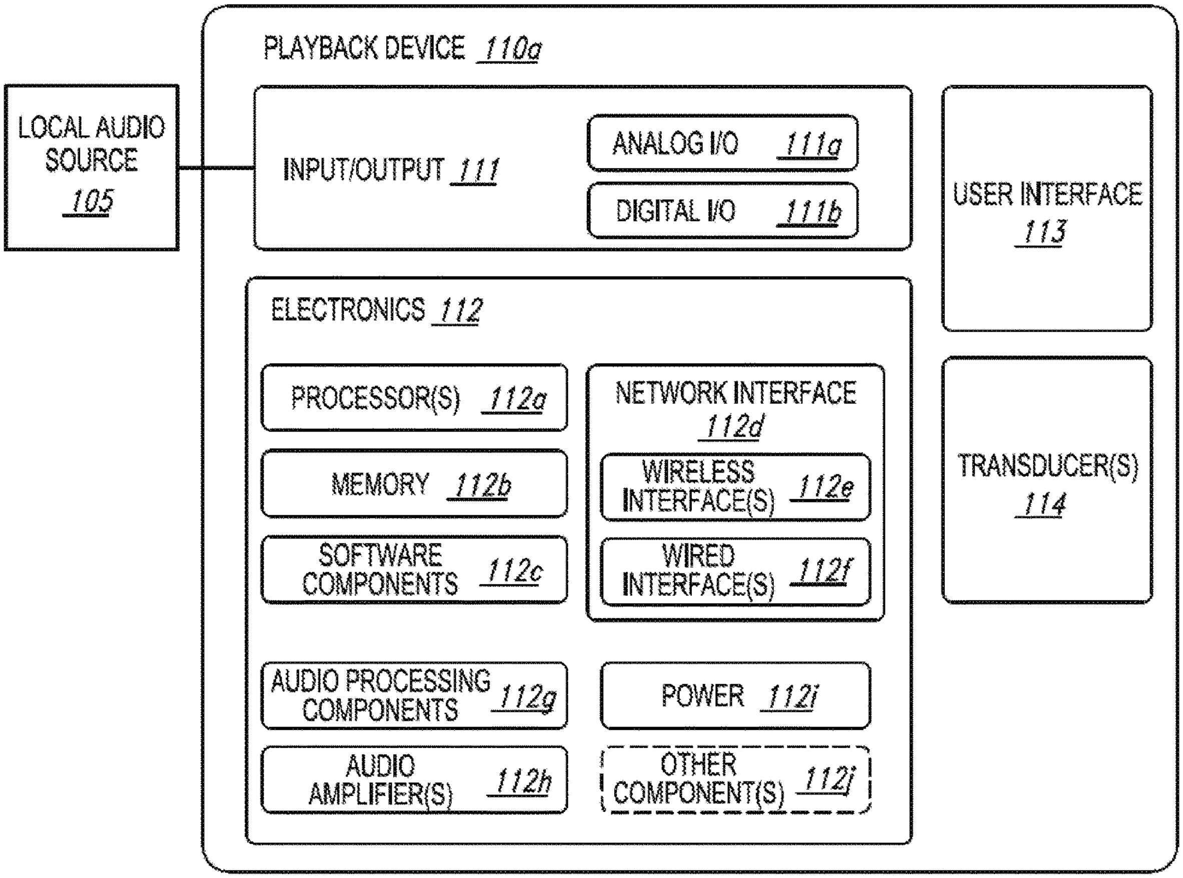
FIG. 1C is a block diagram of a playback device.

FIG. 1C is a block diagram of the playback device **110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b*** comprise interfaces (e.g., ports, plugs, jacks) configured to receive connectors of cables transmitting analog and digital signals, respectively, without necessarily including cables.

The playback device **110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110***a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*c* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, “low frequency” can generally refer to audible frequencies below about 500 Hz, “mid-range frequency” can generally refer to audible frequencies between about 500 Hz and about 2 kHz, and “high frequency” can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
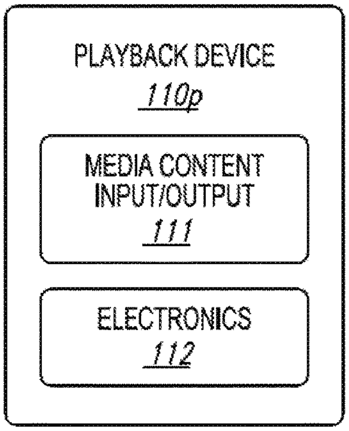
FIG. 1D is a block diagram of a playback device.

By way of illustration, SONOS, Inc. presently offers (or has offered) for sale certain playback devices including, for example, a “SONOS ONE,” “MOVE,” “SONOS FIVE,” “BEAM,” “ARC,” “PLAYBAR,” “PLAYBASE,” “PORT,” “BOOST,” “AMP,” and “SUB.” Other suitable playback devices may additionally or alternatively be used to implement the playback devices of examples disclosed herein. Additionally, one of ordinary skilled in the art will appreciate that a playback device is not limited to the examples described herein or to SONOS product offerings. In some examples, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
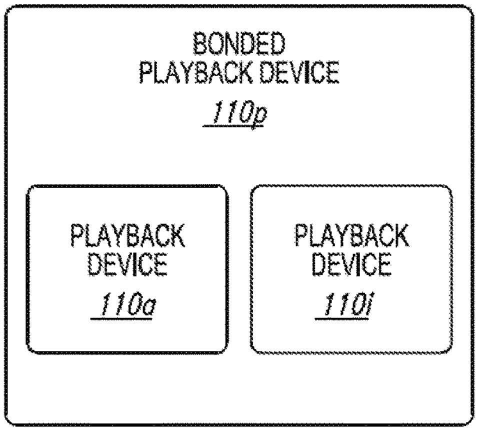
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
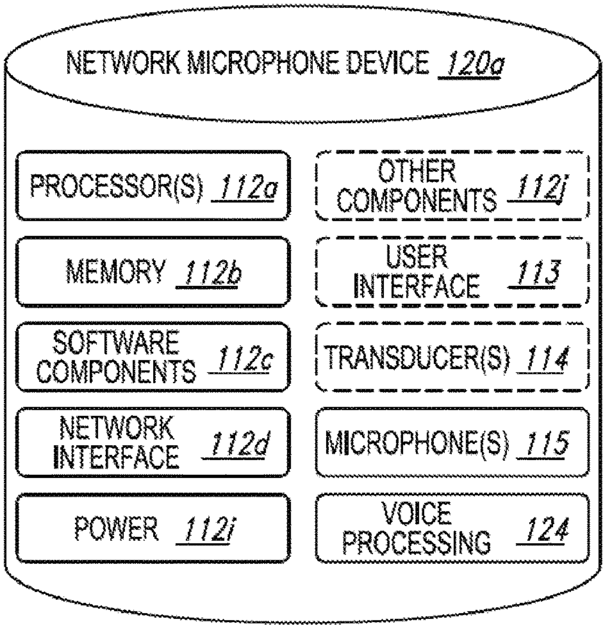
FIG. 1F is a block diagram of a network microphone device.

FIG. 1F is a block diagram of the NMD 120*a* (FIGS. 1A and 1B). The NMD 120*a* includes one or more voice processing components 124 (hereinafter “the voice components 124”) and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for example, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
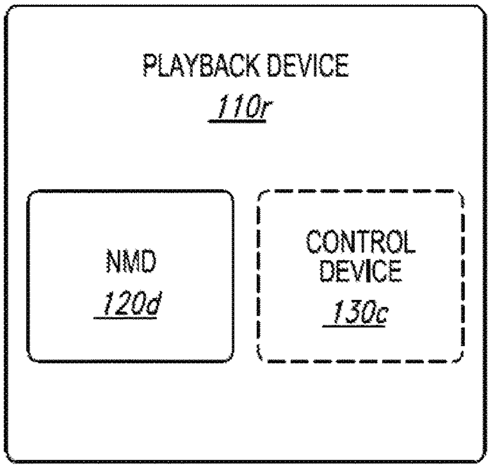
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
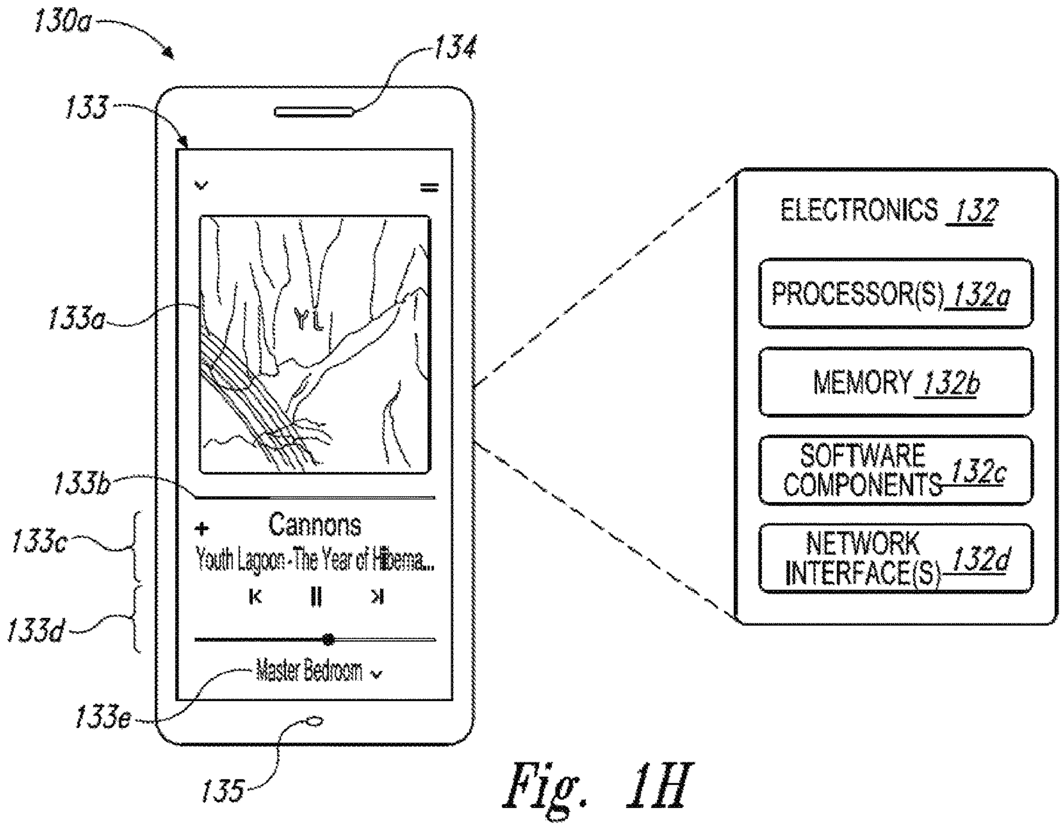
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™ an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
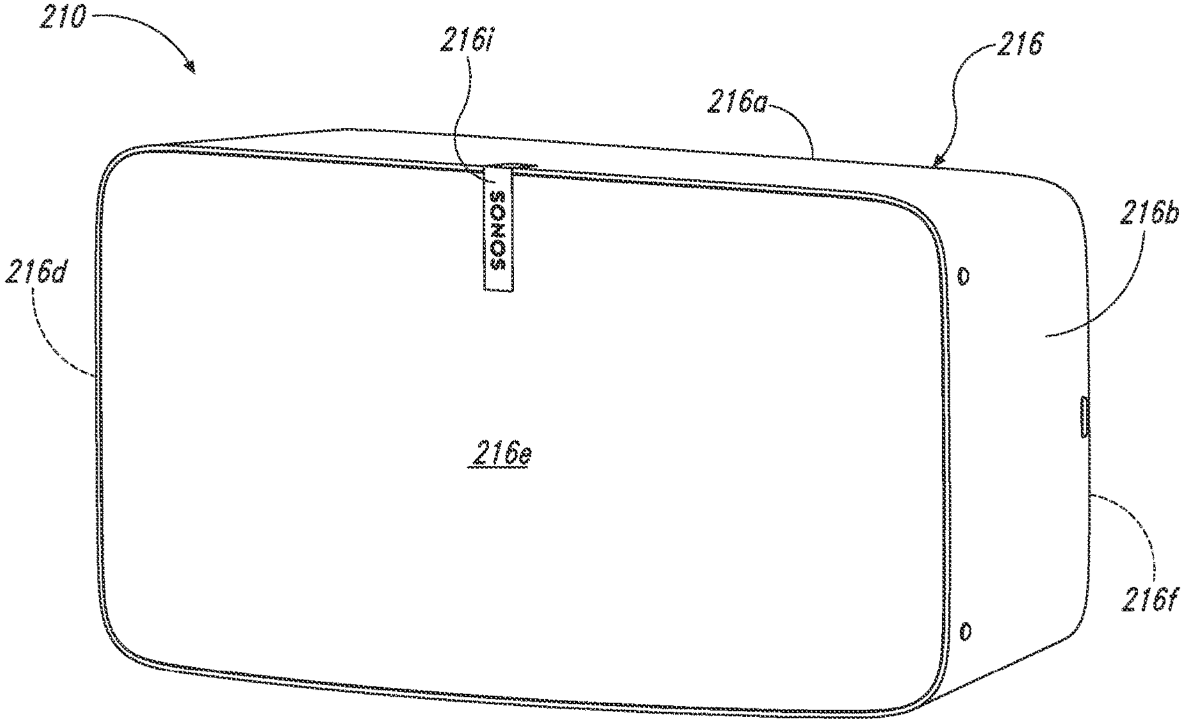
FIG. 2A is a front isometric view of a playback device configured in accordance with examples of the disclosed technology.
Figure 2B:
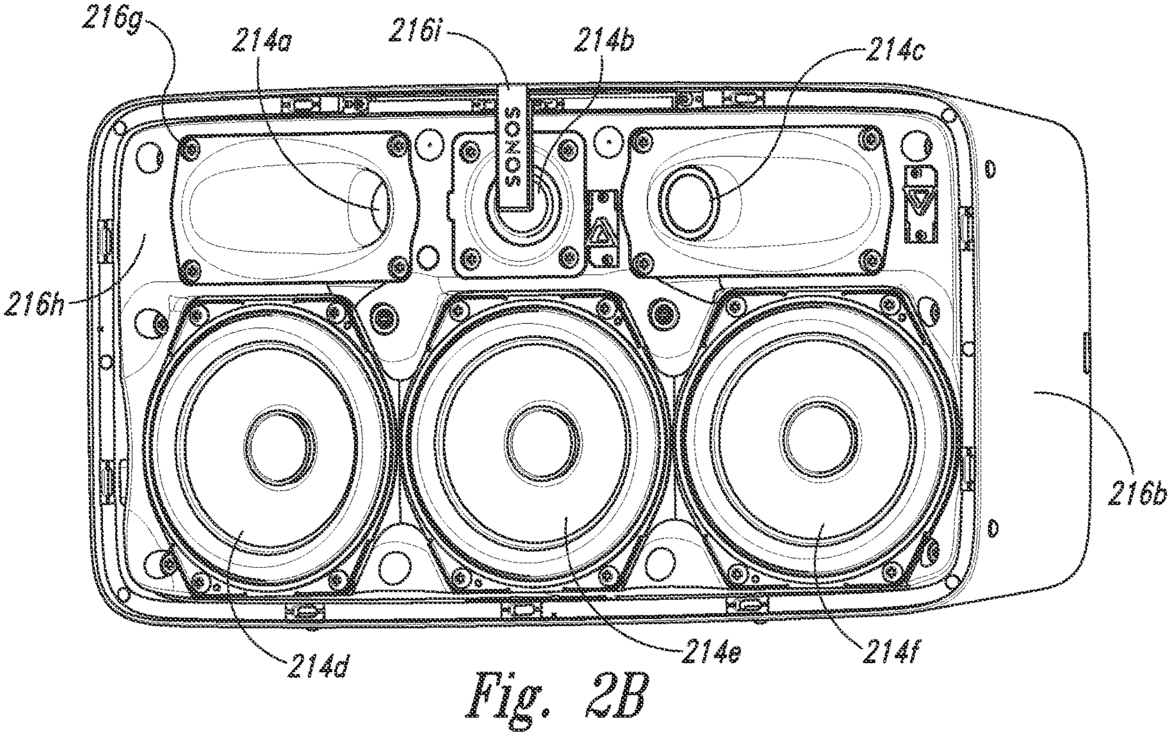
FIG. 2B is a front isometric view of the playback device of FIG. 2A without a grille.
Figure 2C:
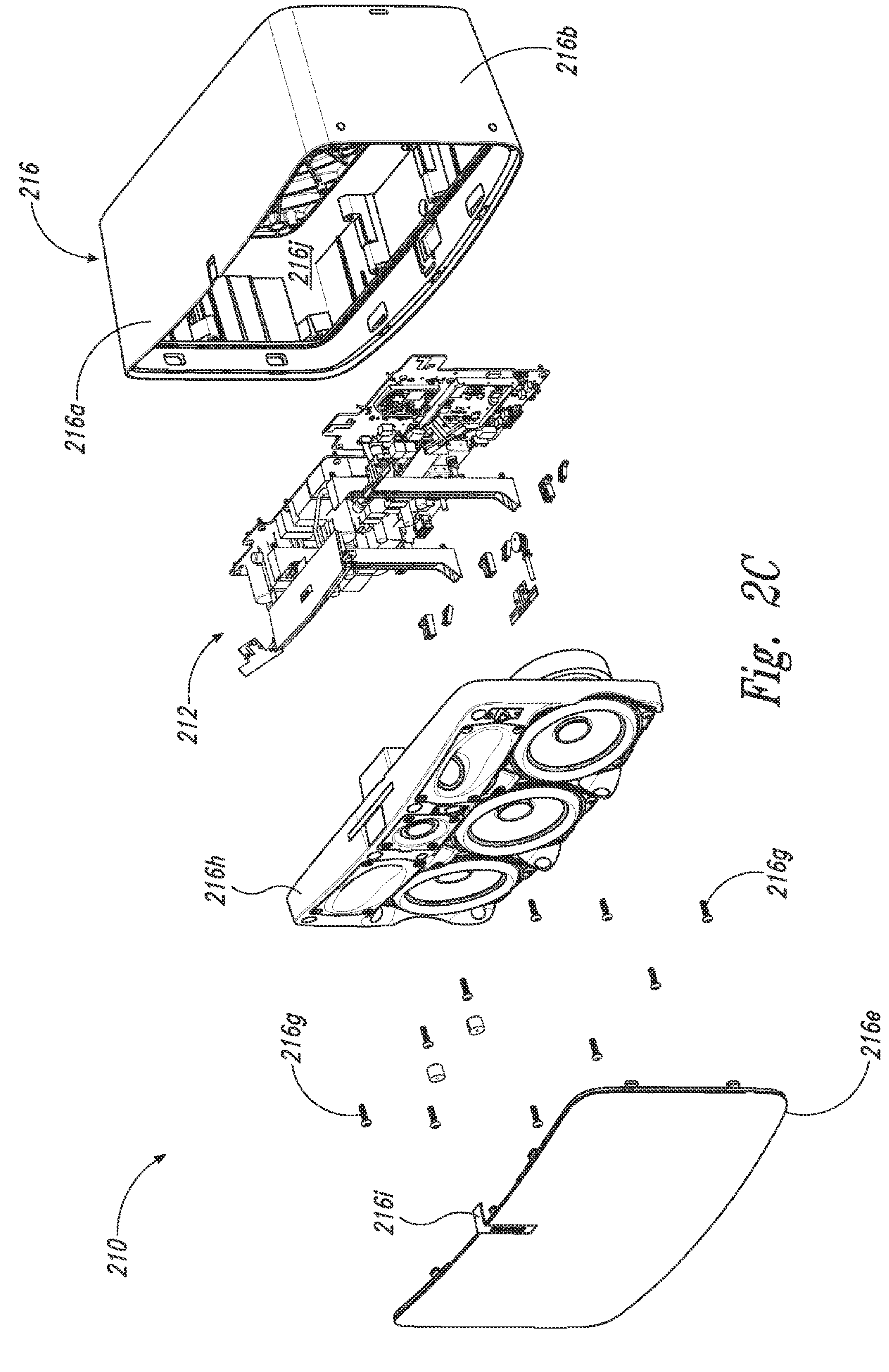
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

Figure 3A:
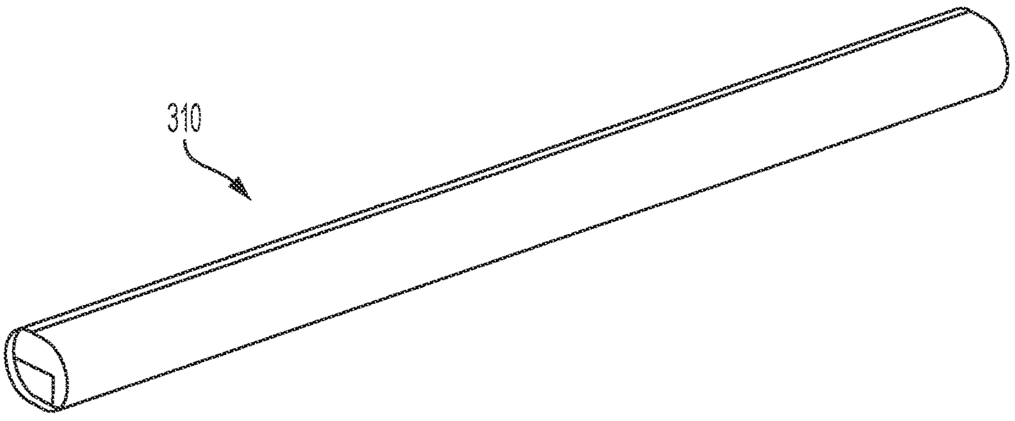
FIGS. 3A and 3B are partially schematic isometric views of an audio playback device configured in accordance with examples of the disclosed technology.
Figure 3B:
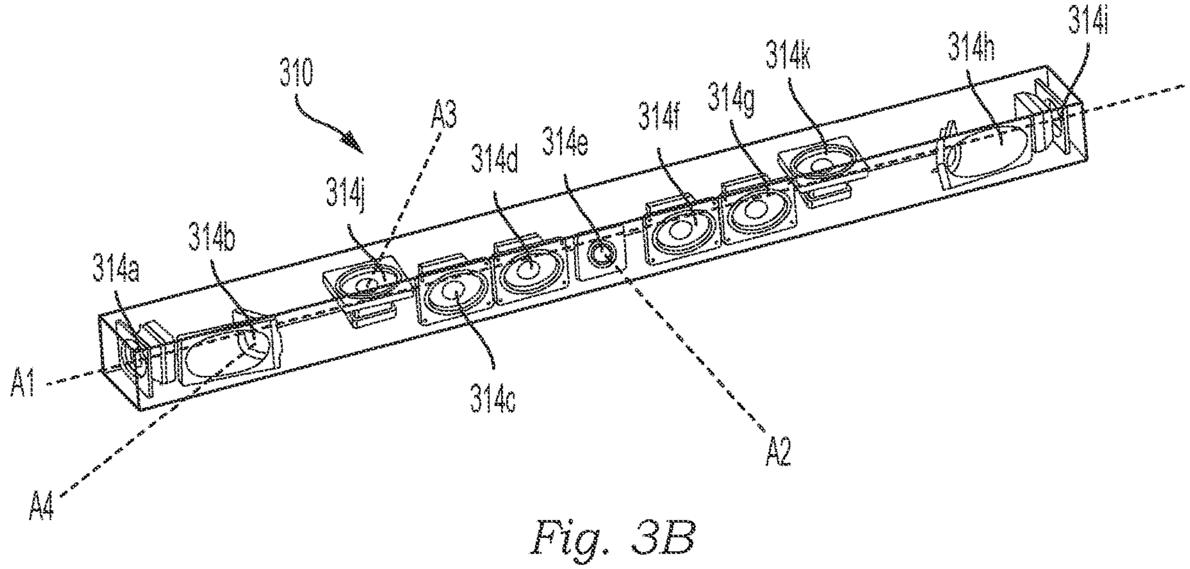

FIG. 3A is a perspective view of an audio playback device 310, and FIG. 3B shows the device 310 with the outer body drawn transparently to illustrate the plurality of transducers 314*a-k* therein (collectively "transducers 314"). The transducers 314 can be similar or identical to any one of the transducers 214*a-f* described previously. In this example, the playback device 310 takes the form of a soundbar that is elongated along a horizontal axis A1 and is configured to face along a primary sound axis A2 that is substantially orthogonal to the first horizontal axis A1. In other embodiments, the playback device 310 can assume other forms, for example having more or fewer transducers, having other form-factors, or having any other suitable modifications with respect to the embodiment shown in FIGS. 3A and 3B.

The playback device 310 can include individual transducers 314*a-k* oriented in different directions or otherwise configured to direct sound along different sound axes. For example, the transducers 314*c-g* can be configured to direct sound primarily along directions parallel to the primary sound axis A2 of the playback device 310. Additionally, the playback device 310 can include left and right up-firing transducers (e.g., transducers 314*j* and 314*k*) that are configured to direct sound along axes that are angled vertically with respect to the primary sound axis A2. For example, the left up-firing transducer 314*j* is configured to direct sound along the axis A3, which is vertically angled with respect to the horizontal primary axis A2. In some embodiments, the up-firing sound axis A3 can be angled with respect to the primary sound axis A2 by between about 50 degrees and about 90 degrees, between about 60 degrees and about 80 degrees, or about 70 degrees.

The playback device 310 can also include one or more side-firing transducers (e.g., transducers 314*a*, 314*b*, 314*h*, and 314*i*), which can direct sound along axes that are horizontally angled with respect to the primary sound axis A2. In the illustrated embodiment, the outermost transducers 314*a* and 314*i* can be configured to direct sound primarily along the first horizontal axis A1 or at least partially horizontally angled therefrom, while the side-firing transducers 314*b* and 314*h* are configured to direct sound along an axis that lies between the axes A1 and A2. For example, the left side-firing transducer 314*b* is configured to direct sound along axis A4.

In operation, the playback device 310 can be utilized to play back 3D audio content that includes a vertical component. As noted previously, certain 3D audio or other immersive audio formats include one or more vertical channels in addition to any lateral (e.g., left, right, front) channels. Examples of such 3D audio formats include DOLBY ATMOS, MPEG-H, and DTS:X formats. Additional details of the playback device 310 of FIGS. 3A and 3B are disclosed in U.S. Provisional Patent Application 62/940,640, SYSTEMS AND METHODS OF SPATIAL AUDIO PLAYBACK WITH ENHANCED IMMERSIVENESS, filed Nov. 26, 2019, the disclosure of which is incorporated herein by reference in its entirety.

In operation, the playback device 310 can also be utilized to play back audio content in one of a plurality of modes, including a first operating mode and a second operating mode. The first mode may correspond to an audio environment in which the playback device 310 plays back multiple separate audio channels (e.g., left, right, and center), and the second mode may correspond to an environment in which the playback device 310 is bonded to one or more satellite playback devices via a network interface, and those satellite playback devices are configured to play back at least some of the channels (e.g., left and right channels). In the second mode, the playback device 310 may constitute a first playback device and the one or more satellite playback devices may constitute second and third playback devices. As explained in detail elsewhere herein, the first playback device 310 may automatically transition from the first mode to the second mode when the second and/or third playback devices become bonded to the first playback device 310.

In the first mode, the playback device 310 can play back, via the transducers 314, multichannel audio content, which may include a left input channel, a right input channel, and a center input channel. In the first mode, the audio content provided via individual transducers 314*a-k* may correspond to an individual input channel (e.g., the left, right, or center input channels) or an array of multiple channels (e.g., the left, right, and center input channels). As an example, in the first mode, transducer 314*a* may provide the right input channel, transducers 314*c-k* may provide an array of the left, right, and center input channels, and transducer 314*i* may provide the left input channel. As another example, in the first mode, each of transducers 314*a-k* may contribute to an array of the left, right, and center input channels.

The arrayed output provided via the transducers 314 may be based on one or more array transfer functions, including a sum array transfer function and a difference array transfer function. For instance, in some examples, the playback device 310 may generate a first input signal corresponding to a sum of the input channels and a second input signal corresponding to a difference of the input channels. The sum and difference array transfer functions can be applied to the generated first and second input signals to produce the arrayed output. Additional details regarding the arrayed output are described in U.S. patent application Ser. No. 16/557,827, SUM-DIFFERENCE ARRAYS FOR AUDIO PLAYBACK DEVICES, filed Sep. 9, 2019, the disclosure of which is incorporated herein by reference in its entirety.

In the second mode, the playback device 310 can play back, via the transducers 314, a portion of the multichannel audio content played back in the first mode, and cause other portions of the multichannel audio content to be played back via satellite playback devices that are bonded to the playback device 310 in the second mode. For example, the playback device 310 can play back a first portion of the audio content, and the satellite playback devices can play back a second portion of the audio content. More specifically, the playback device 310 can play back, via the transducers 314, audio content corresponding at least to the center input channel, and can cause the satellite playback devices to play back audio content corresponding at least to the right and left input channels, e.g., with one of the satellite playback devices providing the right channel and another of the satellite playback devices providing the left channel. In some examples, the playback device 310 may play back the center channel and a portion (e.g., less than a full portion) of the left channel and/or right channel. As such, in the second mode, the audio provided via the playback device 310 may be an array of the left, right, and/or center channels.

In the second mode, the audio played back via the playback device 310 may be based on one or more parameters of at least one of the satellite playback devices. In doing so, the audio played back via the playback device 310 and the satellite playback devices can be substantially synchronous when experienced by the listener and/or have substantially similar acoustic signatures or characteristics (e.g., radiation patterns) to one another. Providing audio with substantially similar or matching acoustic signatures can help "blend" the audio provided from each of the playback device 310 and the satellite playback device to provide a more desirable listening experience. Additionally, by providing synchronous multichannel audio via multiple playback devices, as opposed to a single playback device, the separation between the center input channel and both the right and left input channels is greater, which thereby widens the sound stage experienced by the user and creates a better listening experience.

The playback device 310 can provide audio with different outputs when operating in the first mode relative to the second mode. For example, when the playback device 310 is operating in the first mode, the audio provided (e.g., for the center input channel) can have a first acoustic signature or characteristic, whereas when operating in the second mode, the audio provided (e.g., for the same center input channel) can have a second, different acoustic signature or characteristic. As previously described, this difference can be at least partially attributed to the playback device adjusting the acoustic signature of the audio in the second mode based on one or more parameters associated with the satellite playback devices. As explained in detail elsewhere, the playback device may automatically transition itself from the first mode to the second mode, and in some examples back to the first mode, depending on whether satellite playback devices are bonded thereto. Additionally, in at least some examples, the audio output via the first playback device 310 while operating in the second mode may vary depending on the particular characteristics of the satellite playback devices. In various examples, the characteristics of the satellite playback devices can include a device model, number of transducers, an acoustic signature, radiation pattern, device orientation (e.g., vertical or horizontal), device location relative to the playback device 310, or other similar characteristics. Such characteristics can be received at the first playback device 310 (e.g., from a control device or the satellite playback devices over a local network, from one or more remote computing devices over a wide area network). Additionally or alternatively, such characteristics can be determined via the first playback device 310. For example, one or more microphones of the first playback device 310 can be used to determine an acoustic signature, directivity, etc. of one or more bonded playback devices.

Figure 4:
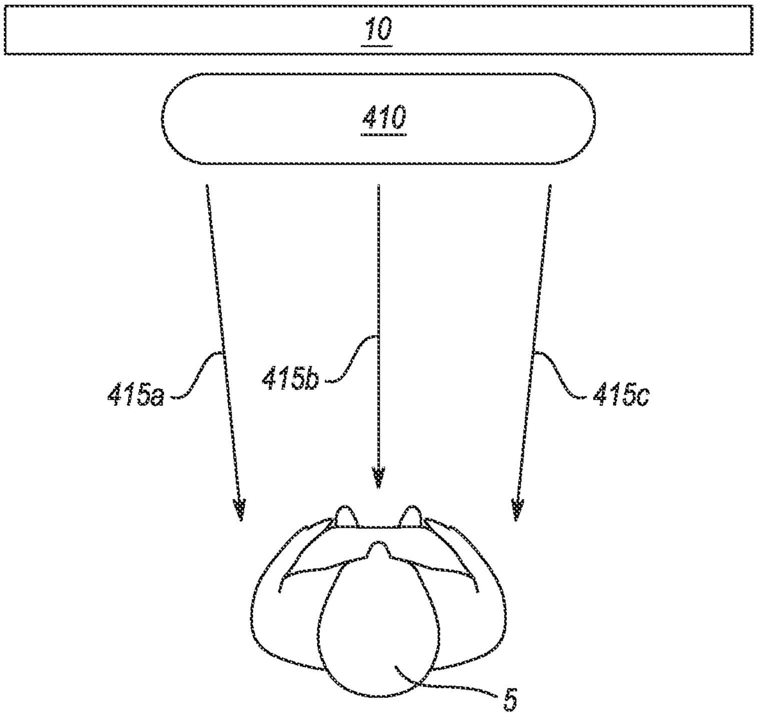
FIG. 4 is a schematic overhead view of an audio playback device configured in accordance with examples of the disclosed technology.

FIG. 4 is a schematic overhead view of an audio playback device 410 configured in accordance with examples of the disclosed technology. The playback device 410 can be similar or identical to the playback device 310 or other playback devices previously described. The playback device 410 shown in FIG. 4 is operating in the first operating mode previously described, and is providing multichannel audio outputs 415*a-c*. Each of the audio outputs 415*a-c* can correspond to audio provided from one or more transducers of the playback device 310. For example, the audio outputs 415*a* and 415*b* may each correspond to audio provided from a single transducer, and the audio output 415*c* may correspond to audio provided from a plurality of transducers. Alternatively, each of the audio outputs 415*a-c* may correspond to audio from a plurality of transducers.

In some examples, the playback device 410 may be operably coupled via a wireless or wired connection to a control device 10. As previously described, the control device 10 can correspond to a network device configured to perform functions relevant to facilitating user access, control and/or configuration of a media playback system including the playback device 410. In some examples, the control device 10 can be a mobile device, a video playback device (e.g., a television), a hub, a dongle, an HDMI adapter, or other structure configured to be operably coupled to the playback device 410 via a network interface. In some examples, the control device 10 may be part of the playback device 410 such that they constitute an integral structure and/or are enclosed within a common housing.

Figure 5:
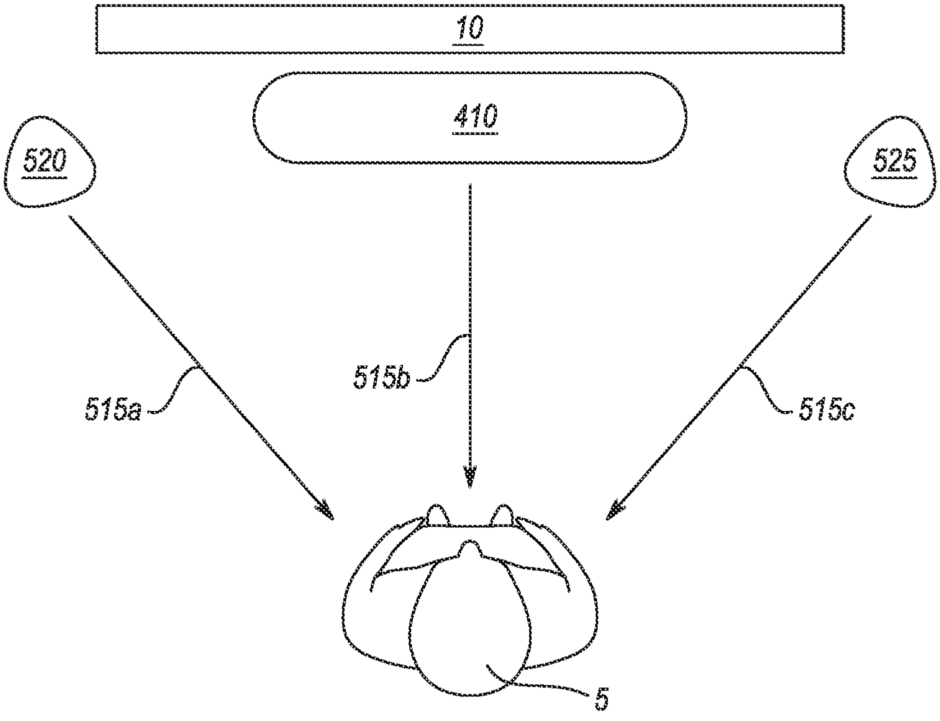
FIGS. 5-7 are schematic overhead views of an audio playback device bonded to one or more other audio playback devices, configured in accordance with examples of the disclosed technology.

FIG. 5 is a schematic overhead view of the audio playback device 410 of FIG. 4 bonded to one or more other audio playback devices 520, 525 configured in accordance with examples of the disclosed technology. The playback device 410 shown in FIG. 5 is a first playback device operating in the second operating mode previously described, and is bonded to a second playback device 520 and a third playback device 525, e.g., via a network interface. The second and third playback devices 520, 525 may correspond to any playback device described elsewhere herein, and may be identical or different from one another. Additionally or alternatively, the second and third playback devices 520, 525 may be identical or different from the first playback device 410. For instance, the first playback device 410 may be a soundbar such as a SONOS ARC or BEAM and the second and third playback devices 520, 525 may each be non-soundbar devices such as a SONOS ONE or SONOS FIVE. The second and third playback devices 520, 525 may constitute "front" speakers (e.g., a front right speaker and a front left speaker), and can each have a distinct directivity relative to the first playback device 410. In some examples, the first playback device 410 may operate in a first orientation (e.g., a substantially horizontal or vertical orientation), and the second and/or third playback devices 520, 525 may operate in a second orientation (e.g., a substantially vertical or horizontal orientation) different than the first orientation. Moreover, the first playback device 410 and the second and third playback devices 520, 525 may operate in such orientations irrespective of whether the first playback device 410 is operating in the first mode or the second mode.

In the second mode, the first playback device 410 can provide audio output 515*b* corresponding at least to the center input channel, the second playback device 520 can provide audio output 515*a* corresponding at least to the left input channel, and the third playback device 525 can provide audio output 515*c* corresponding at least to the right input channel. The first playback device 410 and/or the control device 10 can cause audio outputs 515*a*, 515*c* to be played back via the second playback device 520 and the third playback device 525, respectively.

The audio output 515*b* can correspond to at least to the center input channel, and in some examples to portions of the right input channel and/or left input channel as well. As such, in the second mode, the audio output 515*b* from the first playback device 410 can comprise a full portion of the center input channel and a portion (e.g., not the full portion) of the right input channel and/or left input channel. The audio output 515*b* can correspond to audio from a plurality of transducers of the playback device 410. Moreover, the audio output 515*b* may correspond to an individual input channel (e.g., the center input channel) or an array of multiple channels (e.g., the left, right, and center input channels).

Each of the audio outputs 515*a*, 515*c* can correspond to at least one of the right or left input channels, and in some examples to portions of the center input channel as well. For example, in the second mode, the audio outputs 515*a*, 515*c* from the respective second and third playback devices 520, 525 can each comprise a full portion of either the right or left input channels. As another example, in the second mode, the audio outputs 515*a*, 515*c* can each comprise a full portion of either the right or left input channels, and a portion (e.g., not the full portion) of the center input channel. The audio outputs 515*a*, 515*c* can each correspond to audio from a plurality of transducers of the respective second and third playback devices 520, 525. Moreover, each of the audio outputs 515*a*, 515*c* may correspond to an individual input channel (e.g., the right or left input channels) or an array of multiple channels (e.g., the left and center input channels or the right and center input channels).

In some examples, the audio output 515*b* from the first playback device 410 can be based on one or more parameters associated with the second and/or third playback devices 520, 525. Additionally or alternatively, the audio outputs 515*a*, 515*c* can be based on one or more parameters associated with the first playback device 410. The parameter can include the type, orientation, directivity, and/or relative location of at least one of the other bonded playback devices, and therein the expected audio output(s) therefrom. Basing the audio output 515*b* from the first playback device 410 on the parameter(s) associated with the second and third playback devices 520, 525 can enable the audio output 515*b* to have an acoustic signature or characteristic (e.g., a radiation pattern, polar pattern, etc.) that matches or is substantially similar to the acoustic signature or characteristic of the audio outputs 515*a*, 515*c* from the respective second and third playback devices 520, 525. In doing so, the audio outputs 515*a-c* from each of the playback devices can be sufficiently synchronous and/or "blended" with one another when experienced by the listener.

In some examples, the second playback device 520 may be spaced apart from the first playback device 410 by a first distance and the third playback device 525 may be spaced apart from the first playback device 410 by a second distance different than the first distance. In such examples, the first playback device 410 and/or control device 10 may consider the first and second distances when transmitting audio to be played back via the second and/or third playback devices 520, 525. For instance, if the second playback device 520 is spaced apart further than the third playback device 525, the delay(s) and/or other audio characteristics for playback of the outputs 515*a*, 515*c* via the respective second and third playback devices 520, 525 may differ from one another. Additionally or alternatively, in some examples the second and third playback devices 520, 525 may an equal distance apart from the first playback device 410 but a different distance apart from the user (e.g., the second playback device 520 is closer to the user 5 than the third playback device 525). In such examples, the first playback device 410 and/or control device 10 may consider the distance(s) of each of the second and third playback devices 520, 525 when transmitting audio to be played back via the second and/or third playback devices 520, 525. For example, if the second playback device 520 is spaced apart further from the user 5 than the third playback device 525, the delay(s) and/or other audio characteristics for playback of the outputs 515*a*, 515*c* via the respective second and third playback devices 520, 525 may differ from one another.

In some examples, given the same audio input, the audio output 515*b* provided via the first playback device 410 when operating in the second mode can vary from that of the audio output 415*b* (FIG. 4) provided via the first playback device 410 when operating in the first mode. In various examples, the audio output 515*b* can vary from the audio output 415*b* in the acoustic signature, directivity, radiation pattern, number of transducers utilized, or other suitable characteristic. Additionally or alternatively, when operating in the second mode, the first playback device 410 and/or control device 10 may implement delays for audio provided via one or more of the first, second, and/or third playback devices 410, 520, 525, such that the audio outputs 515*a-c* appear to be sufficiently synchronous and/or blended.

Figure 6:
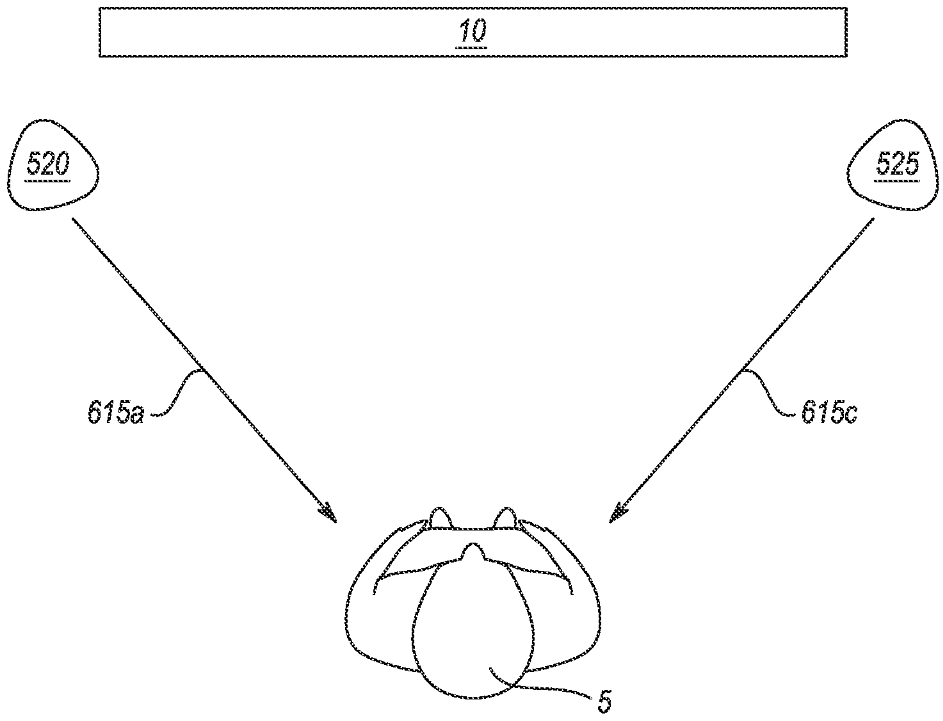

FIG. 6 is a schematic overhead view of the second and third playback devices 520, 525 shown in FIG. 5. As shown in the FIG. 6, the first playback device 410 is not present and/or the second and third playback devices 520, 525 are not bonded to the first playback device 410. In such embodiments, the second and third playback devices 520, 525 can be bonded to one another, e.g., via a network interface, and operate in a primary mode in which the second and third playback devices 520, 525 operate as a stereo pair, e.g., in which the second playback device 520 provides audio output 615*a* corresponding to the left channel and the third playback device 525 provides audio output 615*c* corresponding to the right channel. In such examples, one or more of the second and third playback devices 520, 525 may also provide a partial or full portion of the center channel audio. Each of the audio outputs 615*a*, 615*c* may have one or more audio characteristics different than respective audio outputs 515*a*, 515*c* previously described.

In some examples, the second and/or third playback devices 520, 525 may be bonded to another playback device (e.g., the first playback device 410) and therein transition from the primary operating mode to a secondary operating mode. In such examples, the second and/or third playback device 520, 525 may transmit all or a portion of the center channel audio to the first playback device 410. For example, with reference to FIG. 5, in the secondary mode, the second playback device 520 can provide audio output 515*a* corresponding to the left channel audio, and the third playback device 525 can provide audio output 515*c* corresponding to the right channel audio. In such examples, the control device 10 and/or the second and/or third playback device 520, 525 may also cause at least a portion of the center channel audio to be transmitted to the first playback device 410 for playback. Additionally or alternatively, in the secondary mode, the audio output 515*a* may correspond to only a portion (e.g., not a full portion) of the left channel audio, and the audio output 515*c* may correspond to only a portion (e.g., not a full portion) of the right channel audio, such that the audio output 515*b* corresponds to at least a portion of the right, center, and left channels.

Figure 7:
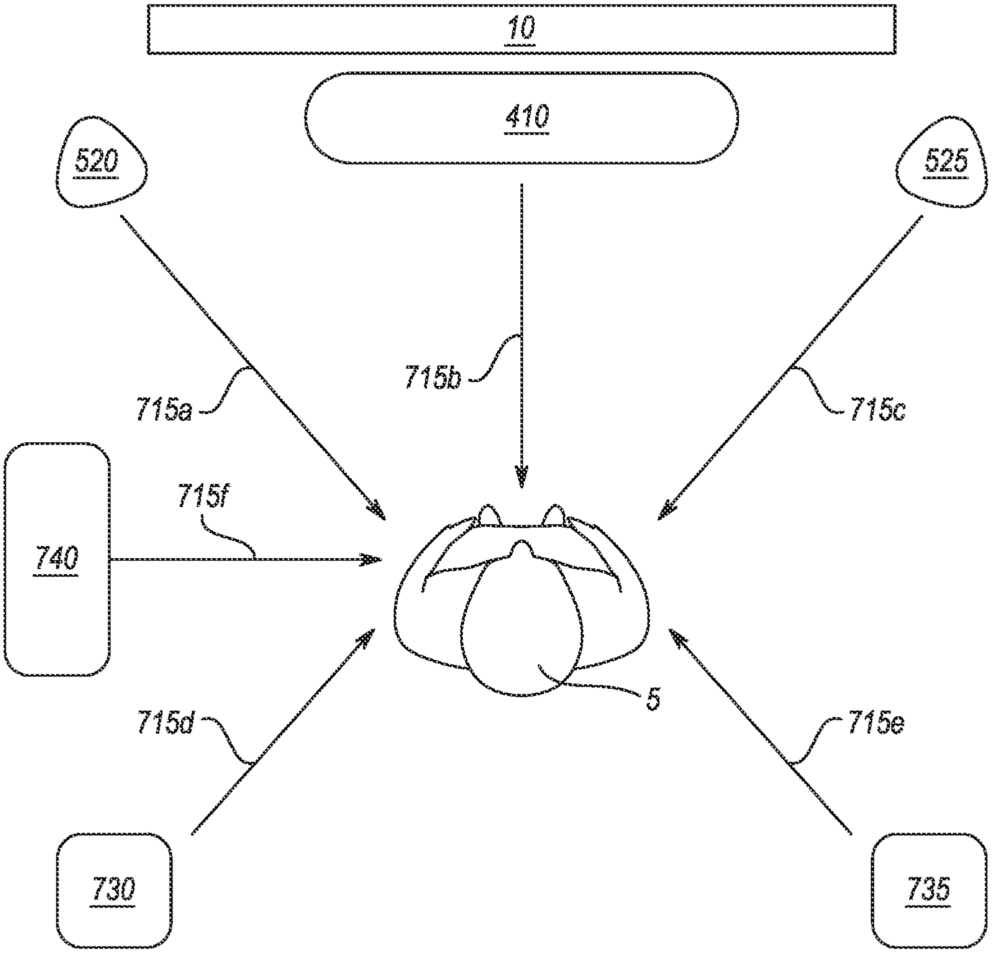

FIG. 7 is another schematic overhead view of the first, second, and third playback devices 410, 520, 525 shown in FIG. 7, and further includes additional audio playback devices, including a fourth playback device 730, a fifth playback device 735, and a sixth playback device 740. The fourth and fifth playback devices 730, 735 may correspond to any other playback device described elsewhere herein, and may each be identical or different from one another. In some examples, the fourth and fifth playback devices may constitute “rear” devices (e.g., a rear left surround and a rear right surround). The sixth playback device 740 can be a woofer or similar device configured to provide low or mid-range frequency outputs.

In operation, the fourth, fifth, and sixth playback devices 730, 735, 740 may be utilized to playback particular channels of a multichannel audio content (e.g., audio content including first, second, third, fourth, fifth, and/or sixth input channels) received at the first playback device 410, control device 10, or any of the playback devices, and/or provided therefrom. For example, the fourth playback device 730 can provide audio output 715*d* corresponding at least to a rear left input channel, the fifth playback device 735 can provide audio output 715 corresponding at least to a rear right input channel, and the sixth playback device 740 can provide audio output 715*f* corresponding at least to a low frequency effects channel. When operating in the second mode, the delays may be implemented for audio provided via one or more of the first, second, third, fourth, fifth, and/or sixth playback devices 410, 520, 525, 730, 735, 740 such that the corresponding audio outputs are perceived to be sufficiently synchronous and/or “blended” with one another. Additionally or alternatively, when operating in the second mode, delays may be implemented for audio provided via one or more of the first, second, third, fourth, fifth, and/or sixth playback devices 410, 520, 525, 730, 735, 740, such that the audio outputs 515*a-f* are perceived to be sufficiently synchronous and/or “blended.”

With reference to the operating modes described herein, such as the first mode illustrated in FIG. 4 and the second mode illustrated in FIGS. 5 and 7, the first playback device 410 may automatically transition from the first mode to the second mode when the first playback device 410 detects that the second and/or third playback devices 520, 525 are bonded thereto, e.g., via a network interface. Additionally, the first playback device 410 may automatically transition from the second mode to the first mode when the first playback device 410 detects that the second and/or third playback devices 520, 525 are unbonded or no longer bonded thereto. The transducers utilized by the playback device 410 to provide particular multichannel audio content, such as individual input channels (e.g., center, right, and left input channels) and/or type of audio content (e.g., bass, surround, low frequency, mid-range frequency, high frequency, etc.) may vary and/or be adjusted based on the operating mode. Table 1 provided below illustrates but one example of how individual transducers may be altered and utilized according to the operating mode that the first playback device 410 is in. As will be apparent to a person of ordinary skill in the art, the transducers may be utilized in ways other than those shown in Table 1. Moreover, while Table 1 assumes the playback device 410 has 13 transducers, playback devices with more or fewer transducers may apply similar utilization techniques as those shown in Table 1 for individual transducers depending on the operating mode.

TABLE 1

Utilization of Individual Transducers Based on Operating Modes

| | First mode with only first playback device | Second mode with second and third playback devices bonded to first playback device | Second mode with second, third, fourth, fifth, and sixth playback devices bonded to first playback device |
|---|---|---|---|
| Bass | 3/4/5/6/(7 + 8)/9/10/11 | 3/4/5/6/(7 + 8)/9/10/11 | 3/4/5/6/(7 + 8)/9/10/11 |
| Front C Mid | 1/3/4/5/6/(7 + 8)/9/10/11/13 | 1/3/4/5/6/(7 + 8)/9/10/11/13 | 1/3/4/5/6/(7 + 8)/9/10/11/13 |
| Front L/R Mid | 1/3/4/5/6/(7 + 8)/9/10/11/13 | | |
| Surround L Mid | 1/3/4/5/6/(7 + 8)/9/10/11/13 | 1/3/4/5/6/(7 + 8)/9/10/11/13 | |
| Surround R Mid | 3/4/5/6/(7 + 8)/9/10/11/13 | 3/4/5/6/(7 + 8)/9/10/11/13 | |
| Front L high | 2 | | |
| Front C high | (7 + 8) | (7 + 8) | (7 + 8) |
| Front R high | 12 | | |
| Surround L high | 1 | 1 | |
| Surround R high | 13 | 13 | |
| Vertical L | 4 | 4 | 4 |
| Vertical R | 10 | 10 | 10 |

Table 1 illustrates how individual transducers of the first playback device 410 are utilized depending on the operating mode of the first playback device 410. In the first mode, in which no satellite playback devices are bonded to the first playback device, transducers 1, 3, 4, 5, 6, 7, 8, 9, 10, 11, and 13 are utilized to provide each of front center channel mid-range audio, front left and right channel mid-range audio, and surround left mid-range audio, and transducers 3, 4, 5, 6, 7, 8, 9, 10, 11, and 13 are utilized to provide bass and surround right channel mid-range audio. Additionally, in the first mode, transducer 2 is utilized to provide front left channel high-range audio, transducers 7 and 8 are utilized to provide from front center channel high-range audio, transducer 12 is utilized to provide front right channel high-range audio, transducer 1 is utilized to provide surround left channel high-range audio, transducer 13 is utilized to provide front right channel high-range audio, transducer 4 is utilized to provide vertical left signals (e.g., DOLBY ATMOS), and transducer 10 is utilized to provide vertical right signals.

For the second mode in which second and third playback devices are bonded to the first playback device, individual transducers are utilized differently than when the first playback device 410 is in the first mode. For example, in such a second mode, the front left and right mid-range audio output, and the front left and right high-range audio output are transmitted to the second or third playback devices and are thus not outputted via any of the transducers of the first playback device. However, a portion of the left and right channels are still outputted via the first playback device in the second mode, as transducers 1, 3, 4, 5, 6, 7, 8, 9, 10, 11, 13 are utilized to provide surround left channel mid-range audio, transducers 3, 4, 5, 6, 7, 8, 9, 10, 11, 13 are utilized to provide surround right channel mid-range audio, transducer 1 is utilized to provide surround left channel high-range audio, and transducer 13 is utilized to provide surround right channel high-range audio.

For the second mode in which second, third, fourth, fifth, and sixth playback devices 520, 525, 730, 735, 740 are bonded to the first playback device 410, individual transducers are utilized differently than when the first playback device 410 is in the first mode or the second mode with only the second and third playback devices 520, 525 bonded thereto. For example, in the second mode in which second, third, fourth, fifth, and sixth playback devices 520, 525, 730, 735, 740 are bonded to the first playback device 410, the left and right channels are transmitted to the other playback devices and thus are not outputted via the first playback device 410.

Figure 8:
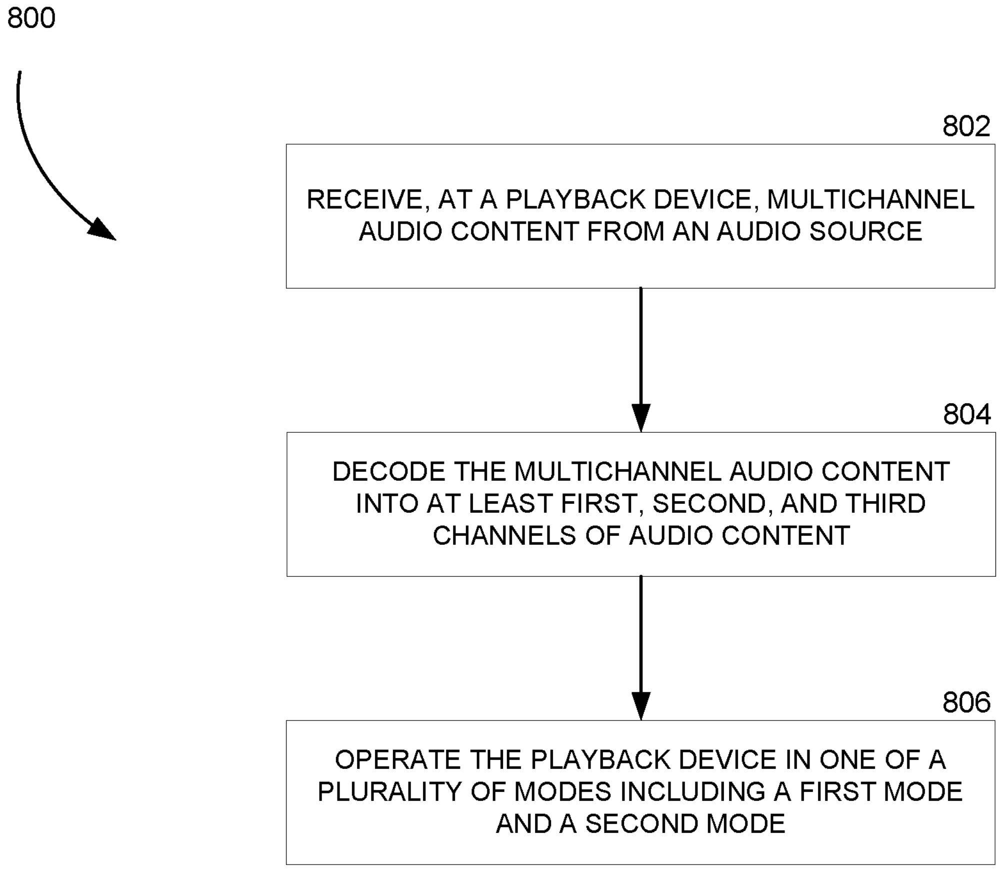
FIGS. 8 and 9 are block flow diagrams of a method for providing audio content via an array of transducers of an audio playback device configured in accordance with examples of the disclosed technology.

FIG. 8 is a block flow diagram of a method 800 for providing multichannel audio content via an array of transducers of an audio playback device configured in accordance with examples of the disclosed technology. The method 800 can comprise receiving, at a playback device (e.g., the playback device 310 or 410; FIGS. 3, 4, 5, 7), multichannel audio content from an audio source (process portion 802), and decoding the multichannel audio content into at least first, second, and third channels of audio content (process portion 804). The audio content may be received from a control device (e.g., the control device 10; FIGS. 4-6). The first, second, and third channels can correspond to center, right, and left channels, respectively. In some examples, the right and left channels may comprise front right and front left channels, respectively. Moreover, in some examples the multichannel audio content may include additional channels, such as rear right, rear left, and low frequency effects channels. Decoding the multichannel audio content may be done via the playback device or via a control device (e.g., the control device 10; FIGS. 4-6).

The method 800 can further comprise operating the playback device in one of a plurality of modes including a first mode and a second mode (process portion 806). The first and second modes can correspond to the respective first and second modes described with reference to FIGS. 3-6 or elsewhere herein. For example, the first mode can correspond to an operating mode in which the playback device is not bonded front right or front left playback devices to or becomes unbonded from any such playback device. In the first mode, the playback device can output each channel of the multichannel audio content via a plurality of transducers of the playback device. In some example, the outputs can correspond to individual channels of the multichannel audio content or an array (e.g., a sum-difference array) of the individual channels.

The second mode can correspond to an operating mode in which the playback device is bonded (e.g., via a network interface) to one or more satellite playback devices (e.g., the second, third, fourth, fifth, and/or sixth playback devices 520, 525, 630, 635, 640; FIGS. 4-6). In those examples in which at least the second and third playback devices are bonded to the first playback device, the first playback device, when in the second mode, can output at least one of the channels (e.g., a center channel) of the multichannel audio content, and can directly or indirectly cause the second playback device to play back another one of the channels (e.g., a right channel) of the multichannel audio content and the third playback device to play back another one of the channels (e.g., a left channel) of the multichannel audio content. In doing so, the first, second, and third playback devices can together provide substantially synchronous playback. In some examples, the playback device in the second mode can play back a portion of the second channel and/or the third channel, with the remaining portions of the second channel and/or third channel being played back via the respective second playback device or third playback device.

In some examples, the first channel of audio content may be played back via the playback device in accordance with an acoustic signature or characteristic based on a parameter associated with at least one of the second or third playback devices. The parameter can include, for example, the type, orientation, directivity, and/or relative location of at least one of the second or third playback devices, and therein the expected audio output(s) therefrom. As such, the audio output from the first playback device may vary depending on the type, orientation, directivity, and/or relative location of the second and/or third playback devices. By considering such parameters, examples of the disclosed technology can produce a more desirable listening experience, because the acoustic signature or characteristic of the center channel played back via the first playback device can be adjusted to match or be substantially similar to the corresponding acoustic signature of characteristic of the right channel being played back via the second playback device and/or the left channel being played back via the third playback device. Stated differently, relative to other conventional playback devices able to play music in a synchronous manner with other playback devices but which do not consider any parameter(s) associated with the other playback devices, or do not attempt to match its acoustic signature to those of the other playback devices, examples of the playback devices for the disclosed technology which are able to provide audio with substantially similar or matching acoustic signatures are expected to produce a more desirable audible experience. Additionally, by providing synchronous multichannel audio via multiple playback devices, as opposed to a single playback device, the separation between the center input channel and both the right and left input channels is greater, which thereby widens the sound stage experienced by the user and further contributes to the listening experience. Relatedly, bonding the second and third playback devices enables the left and right channels, and in some examples portions of the center channel, to be moved further away from the center channel being played back via the playback device.

Figure 9:
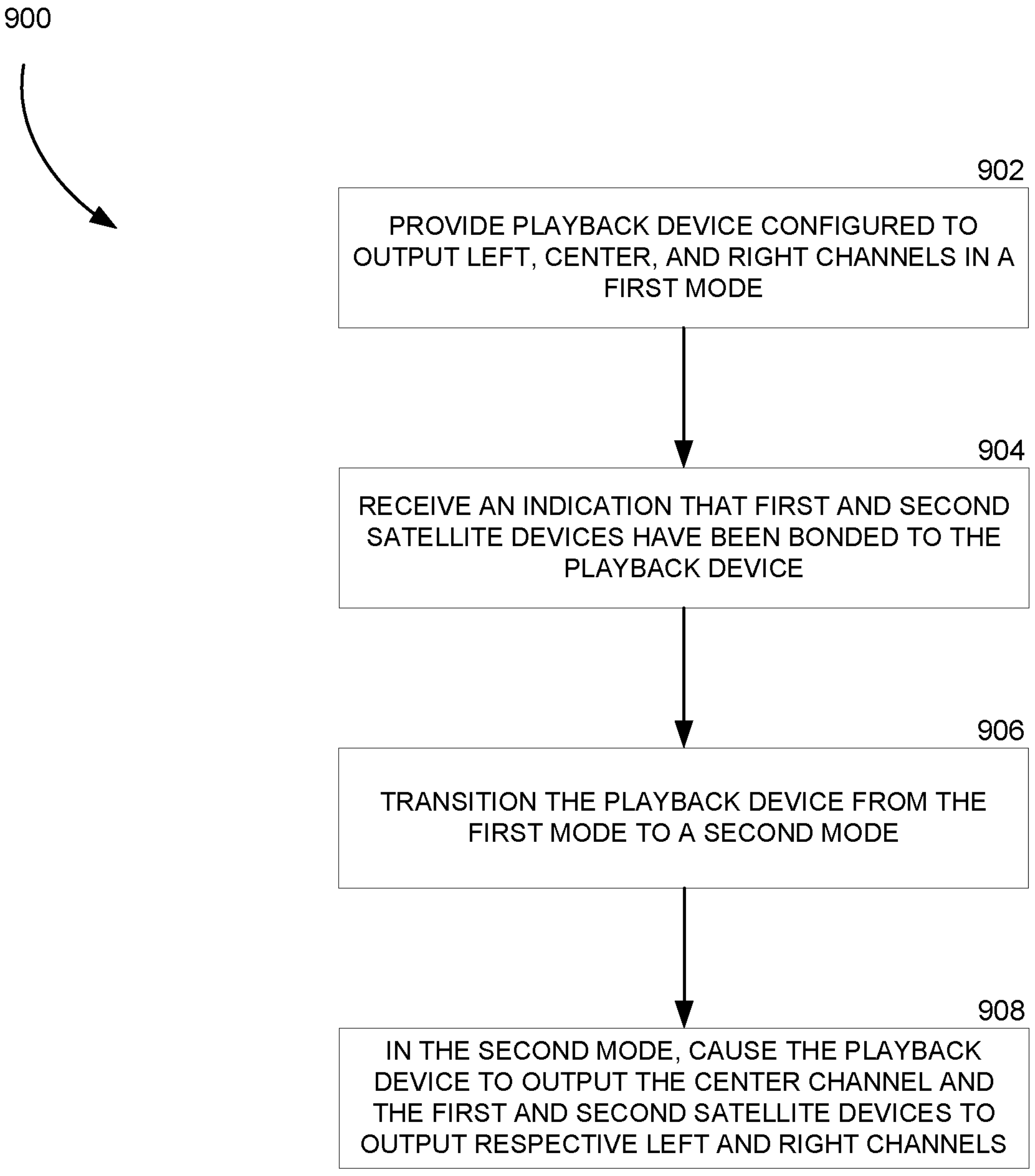

FIG. 9 is a block flow diagram of a method 900 for providing multichannel audio content via an array of transducers of an audio playback device configured in accordance with examples of the disclosed technology. The method 900 includes providing a playback device (e.g., the playback device 310 or 410; FIGS. 3-6) configured to output left, center, and right channels in a first mode (process portion 902). The first mode can correspond to the first mode previously described with reference to FIGS. 3-6 or elsewhere herein.

The method 900 can further include receiving an indication that first and second satellite devices (e.g., second and third playback device 520, 525; FIGS. 5 and 6) have been bonded to the playback device (process portion 904). The first and second satellite devices can be bonded to the playback device via a network interface and/or via a control device (e.g., the control device 10; FIG. 4-6). The indication that the first and second satellite devices have been bonded to the playback device may be received from the respective first and second satellite devices or the control device. In some examples, the indication may comprise a signal including data indicating one or more parameters associated with the satellite devices. As explained elsewhere herein, the parameter can include the type, orientation, directivity, and/or relative location of at least one of the second or third playback devices, and therein the expected audio output(s) therefrom. In some examples, the parameters (e.g., the relative location) may be determined by sending a signal from the playback device to the first and/or second satellite devices, and receiving a response signal from the satellite device(s).

The method 900 can further include, after receiving the indication that the first and second satellite devices have been bonded to the playback device, transitioning the playback device from the first mode to the second mode (process portion 906), and, in the second mode, causing the playback device to output at least the center channel and the first and second satellite devices to output the respective left and right channels. The second mode can correspond to the second mode previously described with reference to FIGS. 3, 5, and/or 6, or elsewhere herein.

In some examples when the playback device is in the second mode, the center channel output from the playback device can correspond to a full portion of the center channel. That is, all of the audio content received for the center channel is output via the playback device. Additionally, in some examples when the playback device is in the second mode, the playback device can output a portion (e.g., less than a full portion) of the right channel and/or a portion (e.g., less than a full portion) of the left channel. In such examples, the output provided via the playback device may be an array of the right, center, and left channels, such that at least a portion of the transducers of the playback device output audio corresponding to the right, center, and left channels. Additionally, in such examples, some transducers (e.g., side firing transducers) of the playback device may output only one of the right, center, or left channels.

In some examples, the center channel output from the playback device may be based on a parameter associated with one or both of the satellite devices, such that when the playback device is in the second mode, an acoustic signature or characteristic of the output from the playback device matches or is similar to a corresponding acoustic signature or characteristic of the output of at least one of the satellite devices. Additionally or alternatively, the playback device may adjust the acoustic characteristic of the output therefrom based on the acoustic characteristic of the output from the second and/or third playback device. As such, over time the acoustic characteristic of the output from the playback device can become more similar to that of the output from the second and/or third playback devices.

Figure 10:
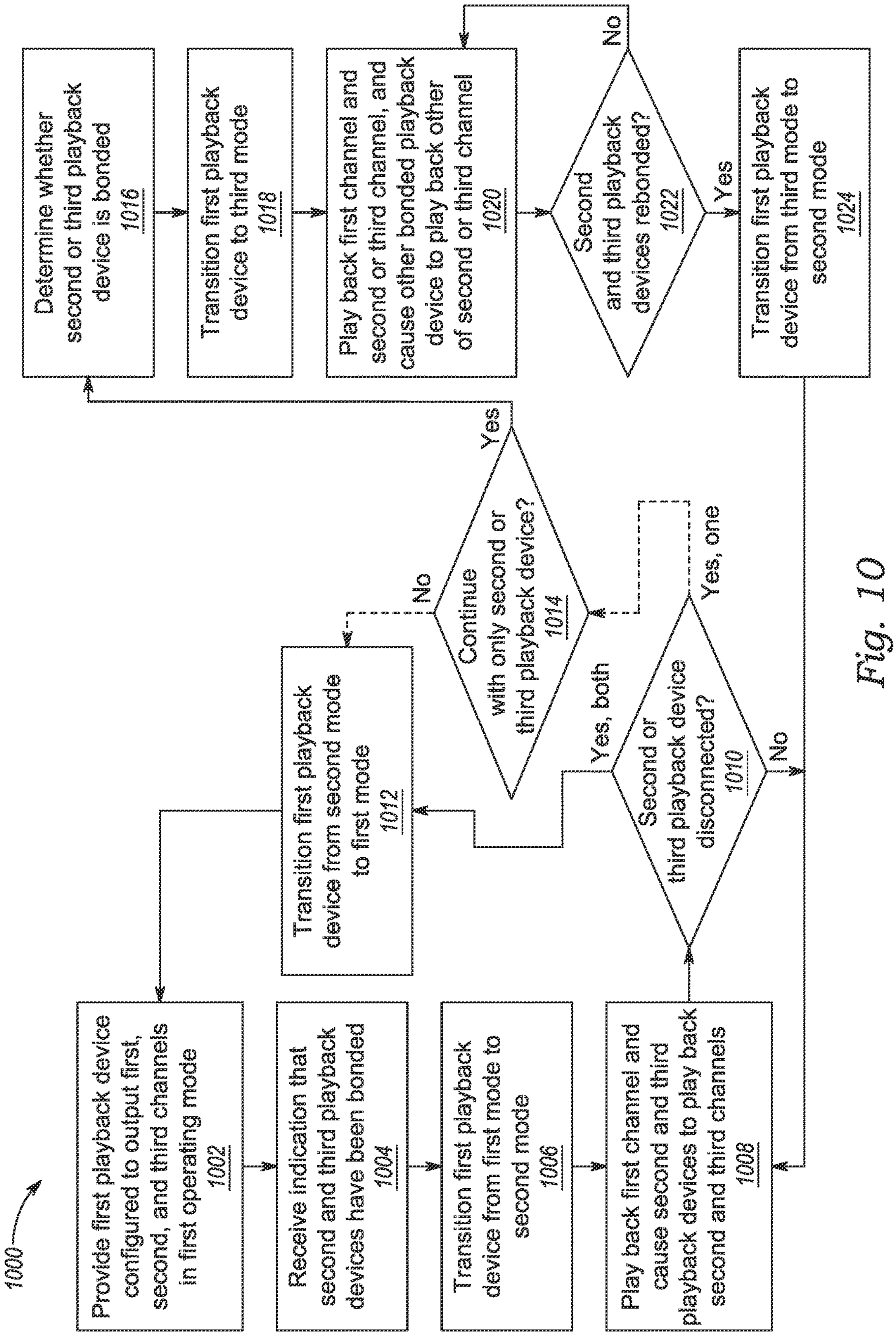
FIG. 10 is a block flow diagram for transitioning an audio playback device from one operating mode to another operating mode, configured in accordance with examples of the disclosed technology.

FIG. 10 is a block flow diagram illustrating a method 1000 for transitioning an audio playback device from one operating mode to another operating mode, configured in accordance with examples of the disclosed technology. As shown in FIG. 10, the method 1000 can include process portions similar to those described with reference to the method 900. For example, the method 1000 can include providing a first playback device configured to output first, second, and third channels in a first operating mode (process portion 1002), receiving an indication that second and third playback devices have been bonded (process portion 1004), transitioning the first playback device from the first mode to a second mode (process portion 1006), and playing back the first channel via the first playback device and causing the second and third channels to be played back via the second and third playback devices respectively (process portion 1008).

The method 1000 can further comprise determining whether the second or third playback device have been disconnected or unbonded (process portion 1010). The second or third playback device may be unbonded if, for example, a user intentionally unbonds the playback device (e.g., via a control device), the device runs out of power, is moved out of the bonded zone, is disconnected from the network interface, or malfunctions. If the second and third playback devices remain bonded, the first playback device continues to play back the first channel and transmit the second and third channels to the second and third playback devices. If the system determines that both of the second and third playback devices are disconnected or unbonded, the system transitions the first playback device from the second mode to the first mode (process portion 1012). In doing so, the first playback outputs the first, second, and third channels. If the system determines that only one of the second and third playback devices are disconnected or unbonded, the system then determines whether to continue with only the first playback device and the remaining second or third playback device (process portion 1014). Determining whether to continue with only the first playback device and the remaining second or third playback device may be based on numerous factors, including user preference or settings, the type of the remaining playback device, and the capability of the remaining playback device to operate without the other of the second or third playback devices. If the system continues with one of the second or third playback devices, the first playback device transitions from the second mode to the first mode (process portion 1012).

If the system continues with one of the second or third playback devices, the system then determines whether the second or third playback device is still bonded to the first playback device (process portion 1016), and then transitions the first playback device to a third mode (process portion 1018). In the third mode, the first playback device plays back the first channel and one of the second or third channels, and causing the other of the second or third channels to be played back via the remaining bonded playback device (process portion 1020). As long as one of the second or third playback devices remains bonded to the first playback device, the first playback device continues to operate in the third mode (process portion 1022). If the second or third playback device becomes rebonded to the first playback device such that both the second and third playback devices are bonded, the first playback device transitions from the third mode to the second mode (process portion 1024).

In some examples, the first playback device may operate in a fourth operating mode. In the fourth mode, one of the playback devices (e.g., the first, second, or third playback device) may be moved to another area such that it is beyond a predetermined distance from one or more of the other playback devices, but still remained bonded thereto. In such examples, the moved playback device may receive a mono signal, a stereo signal with left and right audio, or other signal enabling playback of audio. As a specific example, if the second playback device is moved beyond the predetermined distance, the first playback device may transmit or cause to be transmitted an audio signal for playback on the second playback device. In doing so, the user can continue to enjoy audio in a different area of a listening environment. If the user returns to moved playback device to its original position and/or within the predetermined distance, the moved playback device may automatically transition from the fourth mode to the second mode.

One advantage of the method 1000 illustrated in FIG. 10 is the ability for the first playback device to automatically transition between different operating modes, and thereby enable the first playback device to remain bonded to at least one other playback device even if another playback device becomes unbonded. In doing so, audio content received by the first playback device can be played back via one or more other playback devices to provide a more desirable listening experience, relative to audio content played back via only the first playback device.

Figure 11:
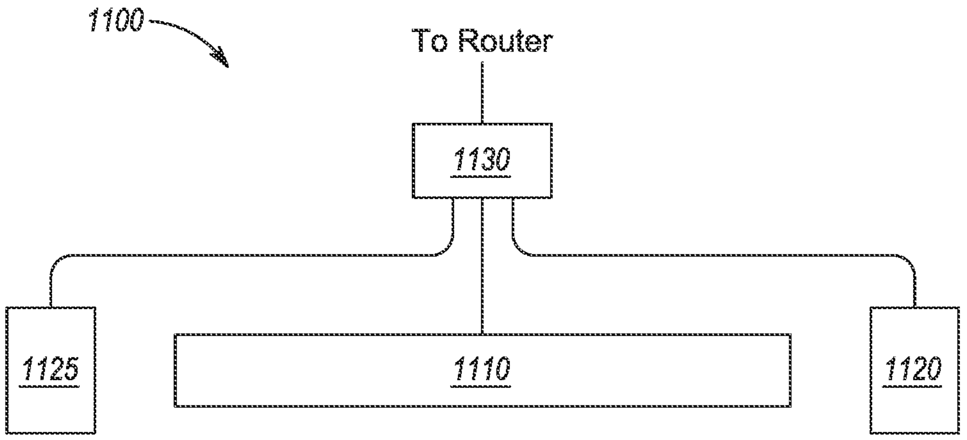
FIGS. 11 and 12 are schematic block diagrams of audio playback devices bonded to a controller, configured in accordance with embodiments of the disclosed technology.
Figure 12:
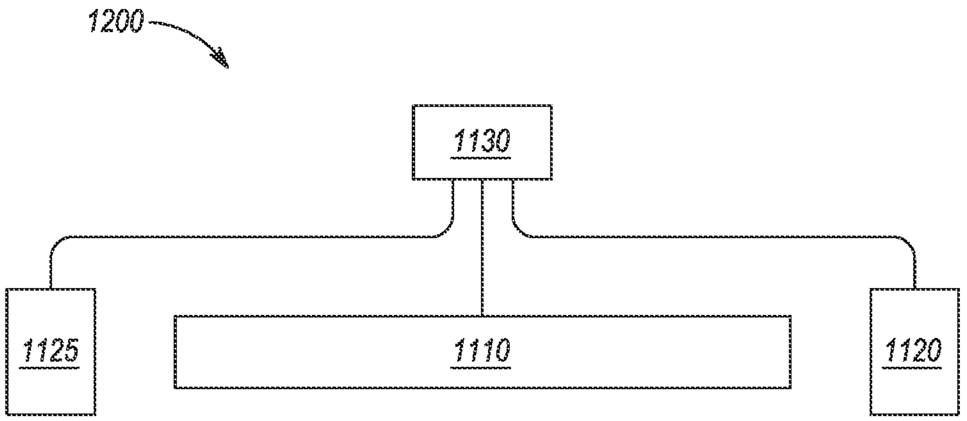

FIGS. 11 and 12 are schematic block diagrams of respective systems 1100, 1200 including audio playback devices bonded to a controller or control device 1130, configured in accordance with embodiments of the disclosed technology. As shown in FIG. 11, the system 1100 includes a first playback device 1110, a second playback device 1120, and a third playback device 1125, each of which are connected (e.g., via a wired connection) to the controller 1130. The first playback device 1110 may correspond to the first playback device 310 (FIGS. 3A and 3B) or 410 (FIGS. 4-6) previously described, the second and third playback devices 1120, 1125 may correspond to the respective second and third playback devices 520, 525 (FIGS. 4-6), the controller 1130 may correspond to the control device 10 (FIGS. 4-6). The controller 1130 can be connected to a router or other device providing a network interface. As shown in FIG. 12, the system 1200 includes the first, second, and third playback devices 1110, 1120, 1125 connected to the controller 1130 (e.g., via a wired connection). The system 1200 need not include a router separate from the controller 1130.

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Additionally, features described with reference to one of the figures may be combined with and/or replace features described in other individual figures. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Examples of the disclosed technology are described below as numbered clauses (1, 2, 3, etc.) for convenience. These are provided as examples and do not limit the disclosed technology. It is noted that any of the dependent clauses may be combined in any combination, and placed into a respective independent clause. The other clauses can be presented in a similar manner.

Clause 1: A first playback device, comprising: a plurality of transducers; a network interface; one or more processors; and a computer-readable medium storing instructions that, when executed by the one or more processors, cause the first playback device to perform operations comprising: receiving, at the first playback device, a source stream of audio content comprising a left input channel, a right input channel, and a center input channel; in a first operating mode, playing back audio via the plurality of transducers based on the left input channel, the right input channel, and the center input channel; and in a second operating mode: playing back audio via the plurality of transducers based on at least the center input channel; causing, via the network interface, audio to be played back via a second playback device based on at least the right input channel; and causing, via the network interface, audio to be played back via a third playback device based on at least the left input channel.

Clause 2: The first playback device of any one of the clauses herein, wherein, in the first operating mode, the plurality of transducers are configured to play back a full portion of the left, right, and center channels, and, in the second operating mode, the plurality of transducers are configured to play back (i) a full portion of the center channel and (ii) none or only a portion of the right and left channels.

Clause 3: The first playback device of any one of the clauses herein, wherein, in the first operating mode, the first playback device is configured to play back the center input channel according to a first radiation pattern, and, in the second operating mode, the first playback device is configured to play back the center input channel according to a second radiation pattern different than the first radiation pattern.

Clause 4: The first playback device of any one of the clauses herein, wherein, in the second operating mode, playing back the audio via the plurality of transducers based on at least the center input channel comprises playing back an arrayed channel output based on a parameter associated with the at least one of the second or third playback devices, the arrayed channel output having a different acoustic signature than that of the audio played back via the plurality of transducers based on the left, right, and center input channels in the first mode.

Clause 5: The first playback device of any one of the clauses herein, further comprising: detecting that at least one of the second or third playback devices is bonded to the first playback device; and after detecting, transitioning the first playback device from the first mode to the second mode.

Clause 6: The first playback device of any one of the clauses herein, wherein, in the second mode, the first playback device operates in a bonded zone with the second and third playback devices, the operations further comprising: detecting that at least one of the second or third playback devices is no longer bonded with the first playback device; and after detecting that at least one of the second or third playback devices is no longer bonded with the first playback device, transitioning the first playback device from the second mode to the first mode.

Clause 7: The first playback device of any one of the clauses herein, wherein operating in the second mode comprises operating the first playback device in a bonded zone with the second and third playback devices, the operations further comprising: detecting that the second playback devices is no longer bonded with the first playback device; and after detecting that the second playback device is no longer bonded with the first playback device, transitioning the first playback device from the second operating mode to a third operating mode, wherein in the third operating mode, the first playback device outputs the right input and center input channels and transmits, via the network interface, the left input channel to the third playback device.

Clause 8: The first playback device of any one of the clauses herein, further comprising, when in the second operating mode, playing back audio via the plurality of transducers based on at least the center input channel and at least one of the right or left input channels.

Clause 9: The playback device of any one of the clauses herein, wherein at least one of the second or third playback devices are configured to output a first audio output when bonded to the first playback device and a second, different audio output when unbonded to the first playback device.

Clause 10: A first playback device, comprising: a plurality of audio transducers; a network interface; one or more processors; and tangible, non-transitory, computer-readable media storing instructions executable by the one or more processors to cause the first playback device to perform functions comprising: receive multichannel audio content from an audio source; decode the multichannel audio content into at least first, second and third channels of audio content; and operate in one of a plurality of modes, the modes including a first mode, and a second mode in which the first playback device is bonded, via the network interface, to at least a second playback device and a third playback device for substantially synchronous playback, wherein: when operating in the first mode, the first playback device is configured to play back the first, second, and third channels of audio content via the plurality of audio transducers, wherein playing back the first channel of audio content in the first mode comprises outputting the first channel of audio content in accordance with a first acoustic characteristic; and when operating in the second mode, the playback device is configured to (i) play back the first channel of audio content in accordance with a second acoustic characteristic different from the first acoustic characteristic, the second acoustic characteristic being based on a parameter associated with at least one of the second or third playback devices, and (ii) transmit, via the network interface, the second and third channels of audio content to the second and third playback devices, respectively.

Clause 11: The first playback device of any one of the clauses herein, wherein the parameter associated with at least one of the second or third playback device includes at least one of (i) a type of playback device, (ii) an orientation, or (iii) a directivity of the second or third playback devices relative to that of the playback device.

Clause 12: The first playback device of any one of the clauses herein, wherein the parameter includes a radiation pattern associated with at least one of the second or third playback devices.

Clause 13: The first playback device of any one of the clauses herein, wherein playing back the first channel of audio content in accordance with the second acoustic characteristic comprises: determining a second radiation pattern of the second playback device; determining a third radiation pattern of the third playback device; and adjusting, based on the determined second and third radiation patterns, the second acoustic characteristic of the first playback device from a first radiation pattern to a fourth radiation pattern, wherein the fourth radiation pattern, relative to the first radiation pattern, is more similar to the second and third radiation patterns.

Clause 14: The first playback device of any one of the clauses herein, wherein playing back audio in the first operating mode and/or the second operating comprises playing back an arrayed channel output based on (i) a sum of two or more of the first, second, and third channel outputs, and/or (ii) a difference of two or more of the first, second, and third channel outputs.

Clause 15: The first playback device of any one of the clauses herein, wherein the first playback device is capable of operating in a first orientation in which the plurality of transducers are spaced apart from one another along a substantially horizontal axis, and a second orientation in which the plurality of transducers are spaced apart from one another along a substantially vertical axis, and wherein, when operating in the first mode and the second mode, the first playback device operates in the first orientation.

Clause 16: The first playback device of any one of the clauses herein, wherein the parameter associated with at least one of the second or third playback devices comprises at least one of a second location of the second playback device or a third location of the third playback device.

Clause 17: The first playback device of any one of the clauses herein, further comprising: one or more microphones, wherein the instructions cause the first playback device to receive, via the one or more microphones, a signal from at least one of the second or third playback devices indicating the second or third location, respectively.

Clause 18: The first playback device of any one of the clauses herein, wherein decoding the multichannel audio content includes decoding fourth, fifth and sixth channels of multichannel audio content, and wherein the first playback device is configured to transmit, via the network interface, the fourth, fifth, and sixth channels of multichannel audio content to corresponding fourth, fifth, and sixth playback devices when operating in both the first mode and the second mode.

Clause 19: A method of playing back audio via a plurality of audio transducers, the method comprising: playing back audio comprising first, second, and third channels via a plurality of transducers of a first playback device; bonding a second playback device to the first playback device for substantially synchronous playback with the first playback device; after bonding the second playback device, playing back audio based on at least the first channel via at least a portion of the transducers, based on a parameter associated with the second playback device; and after bonding the second playback device, causing audio based on at least the second channel to be played back via the second playback device.

Clause 20: The method of any one of the clauses herein, wherein playing back audio comprising the first, second, and third channels comprises operating the first playback device in a first mode, and wherein playing back audio based on at least the first channel comprises operating the first playback device in a second mode.

Clause 21: The method of any one of the clauses herein, wherein bonding the second playback device to the first playback device causes the first playback device to automatically transition from the first mode to the second mode.

Clause 22: The method of any one of the clauses herein, wherein the parameter includes at least one of (i) a type of the second playback device, (ii) an orientation of the second playback device, (iii) a directivity of the second playback device relative to the to that of the first playback device, or (iv) a location of the second playback device relative to that of the first playback device.

Clause 23: The method of any one of the clauses herein, wherein the audio based on at least the first channel played back via the first playback device includes a radiation pattern similar to or matching a radiation pattern of the audio played back via the second playback device.

Clause 24: The method of any one of the clauses herein, wherein playing back audio comprising the first, second, and third channels comprises playing back audio to have a first radiation pattern, and wherein playing back audio based on at least the first channel comprises playing back audio to have a second radiation pattern different than the first radiation pattern.

Clause 25: The method of any one of the clauses herein, wherein playing back the first, second, and third channels comprises playing back an arrayed channel based on (i) a sum of two or more of the first, second, and third channels, and/or (ii) a difference of two or more of the first, second, and third channels.

Clause 26: The method of any one of the clauses herein, further comprising: bonding a third playback device to the first playback device; and after bonding the third playback device, causing the third playback device to play back the third channel output.

Clause 27: The method of any one of the clauses herein, wherein playing back at least the first channel comprises playing back a full portion of the first channel and less than a full portion of the second and third channels.

Clause 28: The method of any one of the clauses herein, further comprising: sending a first signal toward the second playback device; and receiving a second signal from the second playback device in response to the first signal, the second signal indicating a relative location of the second playback device, the parameter comprising the relative location.

Clause 29: A non-transitory computer-readable medium comprising instructions for playing back audio via a plurality of audio transducers, the instructions, when executed by one or more processors, causing the one or more processors to: cause a playback device having a plurality of transducers to operate in one of a plurality of modes, the modes including a first mode, and a second mode in which one or more satellite playback devices are bonded to the playback device for synchronous playback of audio content comprising a first input channel, second input channel, and third input channel, wherein: when in the first mode, the playback device is configured to play back audio based on the first, second, and third input channels via the transducers, and when in the second mode, the playback device is configured to: play back audio based on at least the first input channel via one or more of the transducers, based on a parameter associated with the satellite playback devices, and cause the satellite playback devices to play back the second and third input channels.

Clause 30: The non-transitory computer-readable medium of any one of the clauses herein, wherein, when in the first mode, the played back audio has a first radiation pattern, and when in the second mode, the played back audio has a second radiation pattern different than the first radiation pattern.

Clause 31: The non-transitory computer-readable medium of any one of the clauses herein, wherein, when in the first mode, the playback device is configured to play back a full portion of the first, second, and third input channels, and, when in the second mode, the playback device is configured to play back (i) a full portion of only the first input channel and (ii) none or only a portion of the second and third input channels.

Clause 32: The non-transitory computer-readable medium of any one of the clauses herein, further comprising causing the playback device to transition to the second mode when the satellite playback devices are bonded to the playback device.

Clause 33: The non-transitory computer-readable medium of any one of the clauses herein, further comprising causing the playback device to transition from the second mode to the first mode when one or all of the satellite playback devices are unbonded from the playback device.

Clause 34: The non-transitory computer-readable medium of any one of the clauses herein, wherein the parameter includes at least one of (i) a type of the satellite playback devices, (ii) an orientation of the satellite playback devices, (iii) a directivity of the satellite playback devices relative to the to that of the playback device, or (iv) a location of the satellite playback devices relative to that of the playback device.

The invention claimed is:

1. A media playback system comprising:

a control device comprising:

a wired connection for receiving home theatre audio content from a local audio source; and a first network interface; and a first playback device comprising:

a plurality of transducers enclosed within a common housing; and a second network interface; and one or more computer-readable media storing instructions that, when executed by one or more processors of the media playback system, cause the media playback system to perform operations comprising:

receiving, at the control device via the wired connection, a source stream of home theatre audio content comprising at least a left input channel, a right input channel, and a center input channel;

transmitting, from the control device to the first playback device via the first network interface, at least a portion of the source stream of home theatre audio content for playback;

while the first playback device is in a first operating mode, playing back, via the plurality of transducers of the first playback device: (i) left channel audio based on the left input channel, (ii) right channel audio based on the right input channel, and (iii) center channel audio based on the center input channel;

after a second playback device and a third playback device are bonded to the first playback device for synchronous audio playback, transitioning the first playback device from the first operating mode to a second operating mode;

obtaining a first signal indicative of a location of the second playback device relative to the first playback device;

obtaining a second signal indicative of a location of the third playback device relative to the first playback device; and while the first playback device is in the second operating mode:

playing back, via the plurality of transducers of the first playback device, arrayed center channel audio based on at least the center input channel, wherein an acoustic signature of the arrayed center channel audio is based at least in part on the first signal and the second signal, the arrayed center channel audio having a different acoustic signature than that of the left channel audio, the right channel audio, and the center channel audio played back via the plurality of transducers in the first mode;

causing right channel audio to be played back via the second playback device based on at least the right input channel, the second playback device being separate and spaced apart from the first playback device; and causing left channel audio to be played back via the third playback device based on at least the left input channel, the third playback device being separate and spaced apart from the first playback device.

2. The media playback system of claim 1, wherein the local audio source is a video playback device.

3. The media playback system of claim 1, wherein while the first playback device is operating in the first mode, the second and third playback devices are not bonded to the first playback device for synchronous audio playback.

4. The media playback system of claim 1, wherein obtaining a first signal indicative of a location of the second playback device relative to the first playback device comprises receiving, via one or more microphones of the media playback system, acoustic signals indicative of the location of the second playback device.

5. The media playback system of claim 1, wherein, in the first operating mode, the plurality of transducers are configured to play back a full portion of the left, right, and center input channels, and, in the second operating mode, the plurality of transducers are configured to play back (i) a full portion of the center input channel and (ii) none or only a portion of the right and left input channels.

6. The media playback system of claim 1, wherein, in the first operating mode, the first playback device is configured to play back center channel audio based on the center input channel according to a first radiation pattern, and, in the second operating mode, the first playback device is configured to play back center channel audio based on the center input channel according to a second radiation pattern different than the first radiation pattern.

7. The media playback system of claim 1, wherein the operations further comprise:

while the first playback device is in the second mode, detecting that at least one of the second or third playback devices is no longer bonded with the first playback device; and after detecting that at least one of the second or third playback devices is no longer bonded with the first playback device, transitioning the first playback device from the second mode to the first mode.

8. A method performed by a media playback system comprising a control device and a first playback device, the method comprising:

receiving, at the control device from a local audio source via a wired connection, a source stream of home theatre audio content comprising at least a left input channel, a right input channel, and a center input channel;

transmitting, from the control device to the first playback device, at least a portion of the source stream of home theatre audio content for playback;

while the first playback device is in a first operating mode, playing back, via a plurality of transducers of the first playback device: (i) left channel audio based on the left input channel, (ii) right channel audio based on the right input channel, and (iii) center channel audio based on the center input channel;

after a second playback device and a third playback device are bonded to the first playback device for synchronous audio playback, transitioning the first playback device from the first operating mode to a second operating mode;

obtaining a first signal indicative of a location of the second playback device relative to the first playback device;

obtaining a second signal indicative of a location of the third playback device relative to the first playback device and while the first playback device is in the second operating mode:

playing back, via the plurality of transducers of the first playback device, arrayed center channel audio based on at least the center input channel, wherein an acoustic signature of the arrayed center channel audio is based at least in part on the first signal and the second signal, the arrayed center channel audio having a different acoustic signature than that of the left channel audio, the right channel audio, and the center channel audio played back via the plurality of transducers in the first mode;

causing right channel audio to be played back via the second playback device based on at least the right input channel, the second playback device being separate and spaced apart from the first playback device; and causing left channel audio to be played back via the third playback device based on at least the left input channel, the third playback device being separate and spaced apart from the first playback device.

9. The method of claim 8, wherein the local audio source is a video playback device.

10. The method of claim 8, wherein while the first playback device is operating in the first mode, the second and third playback devices are not bonded to the first playback device for synchronous audio playback.

11. The method of claim 8, wherein obtaining a first signal indicative of a location of the second playback device comprises receiving, via one or more microphones of the media playback system, acoustic signals indicative of the location of the second playback device.

12. The method of claim 8, wherein, in the first operating mode, the plurality of transducers are configured to play back a full portion of the left, right, and center input channels, and, in the second operating mode, the plurality of transducers are configured to play back (i) a full portion of the center input channel and (ii) none or only a portion of the right and left input channels.

13. The method of claim 8, wherein, in the first operating mode, the first playback device is configured to play back center channel audio based on the center input channel according to a first radiation pattern, and, in the second operating mode, the first playback device is configured to play back center channel audio based on the center input channel according to a second radiation pattern different than the first radiation pattern.

14. The method of claim 8, further comprising:

while the first playback device is in the second mode, detecting that at least one of the second or third playback devices is no longer bonded with the first playback device; and after detecting that at least one of the second or third playback devices is no longer bonded with the first playback device, transitioning the first playback device from the second mode to the first mode.

15. One or more tangible, non-transitory computer-readable media storing instructions that, when executed by one or more processors of a media playback system comprising a control device and a first playback device, cause the media playback system to perform operations comprising:

receiving, at the control device from a local audio source via a wired connection, a source stream of home theatre audio content comprising at least a left input channel, a right input channel, and a center input channel;

transmitting, from the control device to the first playback device, at least a portion of the source stream of home theatre audio content for playback;

while the first playback device is in a first operating mode, playing back, via a plurality of transducers of the first playback device: (i) left channel audio based on the left input channel, (ii) right channel audio based on the right input channel, and (iii) center channel audio based on the center input channel;

after a second playback device and a third playback device are bonded to the first playback device for synchronous audio playback, transitioning the first playback device from the first operating mode to a second operating mode;

obtaining a first signal indicative of a location of the second playback device relative to the first playback device;

obtaining a second signal indicative of a location of the third playback device relative to the first playback device; and while the first playback device is in the second operating mode:

playing back, via the plurality of transducers of the first playback device, arrayed center channel audio based on at least the center input channel, wherein an acoustic signature of the arrayed center channel audio is based at least in part on the first signal and the second signal, the arrayed center channel audio having a different acoustic signature than that of the left channel audio, the right channel audio, and the center channel audio played back via the plurality of transducers in the first mode;

causing right channel audio to be played back via the second playback device based on at least the right input channel, the second playback device being separate and spaced apart from the first playback device; and causing left channel audio to be played back via the third playback device based on at least the left input channel, the third playback device being separate and spaced apart from the first playback device.

16. The one or more computer-readable media of claim 15, wherein the local audio source is a video playback device.

17. The one or more computer-readable media of claim 15, wherein while the first playback device is operating in the first mode, the second and third playback devices are not bonded to the first playback device for synchronous audio playback.

18. The one or more computer-readable media of claim 15, wherein obtaining a first signal indicative of a location of the second playback device comprises receiving, via one or more microphones of the media playback system, acoustic signals indicative of the location of the second playback device.

19. The one or more computer-readable media of claim 15, wherein, in the first operating mode, the plurality of transducers are configured to play back a full portion of the left, right, and center input channels, and, in the second operating mode, the plurality of transducers are configured to play back (i) a full portion of the center input channel and (ii) none or only a portion of the right and left input channels.

20. The one or more computer-readable media of claim 15, wherein, in the first operating mode, the first playback device is configured to play back center channel audio based on the center input channel according to a first radiation pattern, and, in the second operating mode, the first playback device is configured to play back center channel audio based on the center input channel according to a second radiation pattern different than the first radiation pattern.

* * * * *